(12) United States Patent
Wu et al.

(10) Patent No.: US 8,005,091 B2
(45) Date of Patent: Aug. 23, 2011

(54) APPARATUS AND METHOD OF GENERATING AND MAINTAINING HYBRID CONNECTION IDENTIFICATIONS (IDS) FOR PEER-TO-PEER WIRELESS NETWORKS

(75) Inventors: Xinzhou Wu, Monmouth Junction, NJ (US); Junyi Li, Bedminster, NJ (US); Saurabh Tavildar, Jersey City, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/165,815

(22) Filed: Jul. 1, 2008

(65) Prior Publication Data
US 2009/0019168 A1    Jan. 15, 2009

Related U.S. Application Data

(60) Provisional application No. 60/948,880, filed on Jul. 10, 2007.

(51) Int. Cl.
*H04L 12/28* (2006.01)
(52) U.S. Cl. ...... 370/395.3; 370/207; 370/208; 370/345
(58) Field of Classification Search .......... 370/208, 370/345, 207, 395.3
See application file for complete search history.

(56) References Cited

U.S. PATENT DOCUMENTS

| | | | |
|---|---|---|---|
| 6,477,157 B1 | 11/2002 | Kim et al. | |
| 7,486,928 B2 * | 2/2009 | Izumikawa et al. | 455/11.1 |
| 7,564,829 B2 * | 7/2009 | Jin et al. | 370/343 |
| 2005/0036456 A1 * | 2/2005 | Laroia et al. | 370/328 |
| 2005/0201269 A1 * | 9/2005 | Shim et al. | 370/208 |
| 2005/0286451 A1 * | 12/2005 | Kim et al. | 370/310 |
| 2006/0154663 A1 * | 7/2006 | Son et al. | 455/435.1 |

(Continued)

FOREIGN PATENT DOCUMENTS
WO    WO2007053954 A1    5/2007

OTHER PUBLICATIONS

International Search Report and Written Opinion—PCT/US08/069437, International Searching Authority—European Patent Office, Feb. 4, 2009.

(Continued)

*Primary Examiner* — Ricky Ngo
*Assistant Examiner* — Dewanda Samuel
(74) *Attorney, Agent, or Firm* — Peng Zhu; James K. O'Hare

(57) ABSTRACT

An apparatus and method are disclosed for generating a transmission connection identifier (CID) for a transmitter/receiver pair in a wireless network. The CID may be selected from or mapped to a hybrid CID space comprising a first set of orthogonal CIDs and a second set of non-orthogonal (random or pseudo-random) CIDs. When a transmitter device wants to initiate a peer-to-peer connection with a receiver device, the transmitter and receiver devices attempt to obtain a CID to identify their connection within a traffic channel in a shared frequency space. The first and/or second device attempt to select a CID from the first set of orthogonal CIDs. However, if a CID collision is detected, the first and second devices select their CID from the second set of non-orthogonal CIDs. The selected transmission CID may be used during a time slot or interval to facilitate communications between the first and second devices.

40 Claims, 18 Drawing Sheets

U.S. PATENT DOCUMENTS

| | | | |
|---|---|---|---|
| 2007/0072604 A1 | 3/2007 | Wang | |
| 2007/0286066 A1* | 12/2007 | Zhang et al. | 370/208 |
| 2008/0026750 A1* | 1/2008 | Harris et al. | 455/435.1 |
| 2008/0101213 A1* | 5/2008 | Mohanty et al. | 370/208 |
| 2008/0137594 A1* | 6/2008 | Roh et al. | 370/328 |
| 2008/0232401 A1* | 9/2008 | Ahmadi et al. | 370/469 |
| 2008/0291875 A1* | 11/2008 | Kang et al. | 370/331 |

OTHER PUBLICATIONS

Yeh, et al., "A QoS MAC protocol for differentiated service in mobile ad hoc networks" International Conference on Parallel Processing, Oct. 6, 2003, pp. 349-356.
Piscataway, NJ, USA, XP010664186.

* cited by examiner

APPARATUS AND METHOD OF GENERATING AND MAINTAINING HYBRID CONNECTION IDENTIFICATIONS (IDS) FOR PEER-TO-PEER WIRELESS NETWORKS

CLAIM OF PRIORITY UNDER 35 U.S.C. §119

The present Application for Patent claims priority to U.S. Provisional Application No. 60/948,880 entitled "Apparatus and Method for Hybrid Transmission Identifications (IDs) for Wireless Peer-To-Peer Networks" filed Jul. 10, 2007, and assigned to the assignee hereof and hereby expressly incorporated by reference herein.

BACKGROUND

1. Field

The following description generally relates to wireless communications and, in particular, generating and maintaining pseudo-random transmission CIDs in a wireless network where both ad hoc and local access point (AP) communications coexist.

2. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus a significant subset of spectrum may be unused in a given geographic location in a given time interval.

According to another example, wireless communication systems often times employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range, power may be inefficiently utilized, and so forth.

Therefore, a way is needed to allocate and or maintain peer identifiers within peer-to-peer communication networks that utilize a share frequency spectrum.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one example, a first device may be configured to generate and utilize a connection identifier for a peer-to-peer communication connection between the first device and a second device in a wireless communications network. A traffic management channel slot may be partitioned into a first and second subsets of transmission resource units, where the traffic management channel slot includes a plurality of OFDM symbols. Each of the OFDM symbols may include a plurality of tones. Each of the transmission resource units may include one of the plurality of tones in one of the plurality of OFDM symbols. The first subset of transmission resource units may be associated with orthogonal connection identifiers and the second subset of transmission units may be associated with non-orthogonal connection identifiers. The first device then determines, selects, or obtains a first connection identifier.

The first device may select a first transmission resource unit from one of either the first and second subsets of transmission resource units as a function of the first connection identifier. A transmission request signal may be transmitted from the first device to the second device using the first transmission resource unit. The first device may then transmit traffic data to the second device in a traffic channel slot corresponding to the traffic management channel slot.

The first transmission resource unit may be selected from one of the first and second subsets of transmission units as a function of whether the first connection identifier is an orthogonal or a non-orthogonal connection identifier. The first transmission resource unit may belong to the first subset if it is decided to use an orthogonal connection identifier as the first connection identifier. Otherwise, the first transmission resource unit may belong to the second subset if it is decided to use a non-orthogonal connection identifier as the first connection identifier.

The first and second subsets of transmission resource units may be non-overlapping, and partitioning of the traffic management channel slot into the first and second subsets may be predetermined and independent of the first connection identifier.

The first device may selecting the first connection identifier from a predetermined set of a plurality of connection identifiers if it is determined to use an orthogonal connection identifier. The first device then monitors a connection identifier broadcast channel to determine whether the first connection identifier is being utilized by another connection in the proximity. If the first device determines that the first connection identifier is being utilized by another connection in the proximity, it switches to a second connection identifier Additionally, the first device may send a control message to the second device to indicate the intent of changing the first connection identifier to the second connection identifier. In one example, the second connection identifier may be a non-orthogonal connection identifier. In another example, the second connection identifier may be an orthogonal connection identifier.

The first device may also calculate a robustness measure of using an orthogonal connection identifier and, if the calculated robustness measure is below a certain threshold, may determine to switch to a non-orthogonal connection identifier. The robustness measure may be calculated as a function of the rate at which the first device has determined to switch from an orthogonal connection identifier to another connection identifier in a time interval.

The second connection identifier may be an orthogonal connection identifier. Prior to switching to the second connection identifier, the first device may monitor the connection identifier broadcast channel corresponding to the second connection identifier to determine whether the second connection identifier is being utilized by other connections in the proximity. If the first device determines that the second connection identifier is unused by another connection in the proximity, it may then determine to switch to the second connection identifier Prior to switching to the second connection identifier, the first device may switch to a non-orthogonal connection identifier. Also, prior to monitoring the connection identifier broadcast channel, the first device may switch to a non-orthogonal connection identifier.

If the determined first connection identifier is a non-orthogonal connection identifier, the first device may determine the first connection identifier as a function of an identifier of the first device and a second identifier of the second device. Prior to transmitting traffic data, the first device may scramble the traffic data using a scrambling sequence derived from the first connection identifier and a value of the time counter.

In another example, a target second device may be configured to generate and/or utilize a connection identifier for a peer-to-peer communication connection between a first device and the second device in a wireless communications network. A traffic management channel slot may be partitioned into a first and second subsets of transmission resource units, the traffic management channel slot including a plurality of OFDM symbols and each of the OFDM symbols including a plurality of tones. Each of the transmission resource units may include one of the plurality of tones in one of the plurality of OFDM symbols. The first subset of transmission resource units may be associated with orthogonal connection identifiers. The second subset of transmission units may be associated with non-orthogonal connection identifiers.

The second device may obtain a first transmission resource unit from one of either the first and second subsets of transmission resource units as a function of a first connection identifier. The second device may then receive a transmission request signal from the first device using the first transmission resource unit. Subsequently, the second device may receive traffic data from the first device in a traffic channel slot corresponding to the traffic management channel slot.

The first transmission resource unit may be selected from one of the first and second subsets of transmission units as a function of whether the first connection identifier is an orthogonal or a non-orthogonal connection identifier. The first transmission resource unit may belong to the first subset if it is decided to use an orthogonal connection identifier as the first connection identifier. Otherwise, the first transmission resource unit may belong to the second subset if it is decided to use a non-orthogonal connection identifier as the first connection identifier.

In one example, the first and second subsets of transmission resource units may be non-overlapping, and partitioning of the traffic management channel slot into the first and second subsets may be predetermined and independent of the first connection identifier.

The second device may select the first connection identifier from a predetermined set of a plurality of connection identifiers if it is determined to use an orthogonal connection identifier. The second device then monitors a connection identifier broadcast channel to determine whether the first connection identifier is being utilized by another connection in the proximity. If the second device determines that the first connection identifier is being utilized by another connection in the proximity, it may switch to a second connection identifier.

In one example, if the determined first connection identifier is a non-orthogonal connection identifier, the first connection identifier may be determined as a function of an identifier of the first device and a second identifier of the second device. The received traffic data may be descrambled using a descrambling sequence prior to transmission, the descrambling sequence being derived from the first connection identifier and a value of the time counter.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
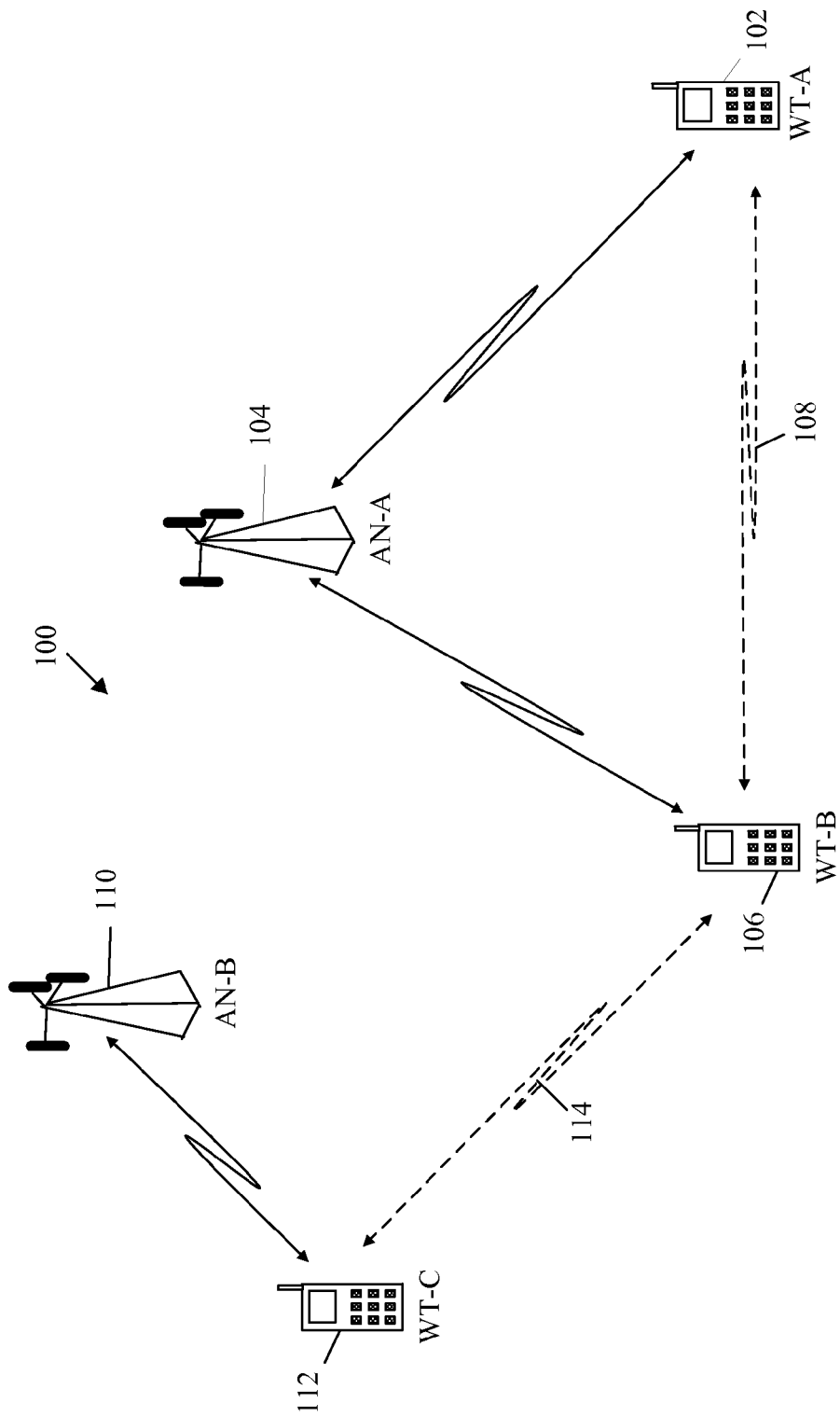
FIG. 1 is a block diagram illustrating the how an ad hoc peer-to-peer network may be implemented within the same frequency spectrum as a wide area network.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

In one embodiment, an apparatus and method are disclosed for generating a transmission (connection) identifier (CID) for a transmitter/receiver pair in a wireless network. The CID may be selected from or mapped to a hybrid CID space comprising a first set of orthogonal CIDs and a second set of non-orthogonal (random or pseudo-random) CIDs. When a transmitter device wants to initiate a peer-to-peer connection with a receiver device, the transmitter and receiver devices attempt to obtain a CID to identify their connection within a traffic channel in a shared frequency space. The first and/or second device attempt to select a CID from the first set of orthogonal CIDs. However, if a CID collision is detected, the first and second devices select their CID from the second set of non-orthogonal CIDs. The selected transmission CID may be used during a time slot or interval to facilitate communications between the first and second devices. If a non-orthogonal CID is selected, it may be changed to an orthogonal CID on a subsequent time interval or slot or if a CID collision is resolved.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers, desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., OFDM symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. WT-A can then transmit traffic to WT-B using connection 108. WT-B can also transmit traffic to WT-A using connection 108.

Figure 2:
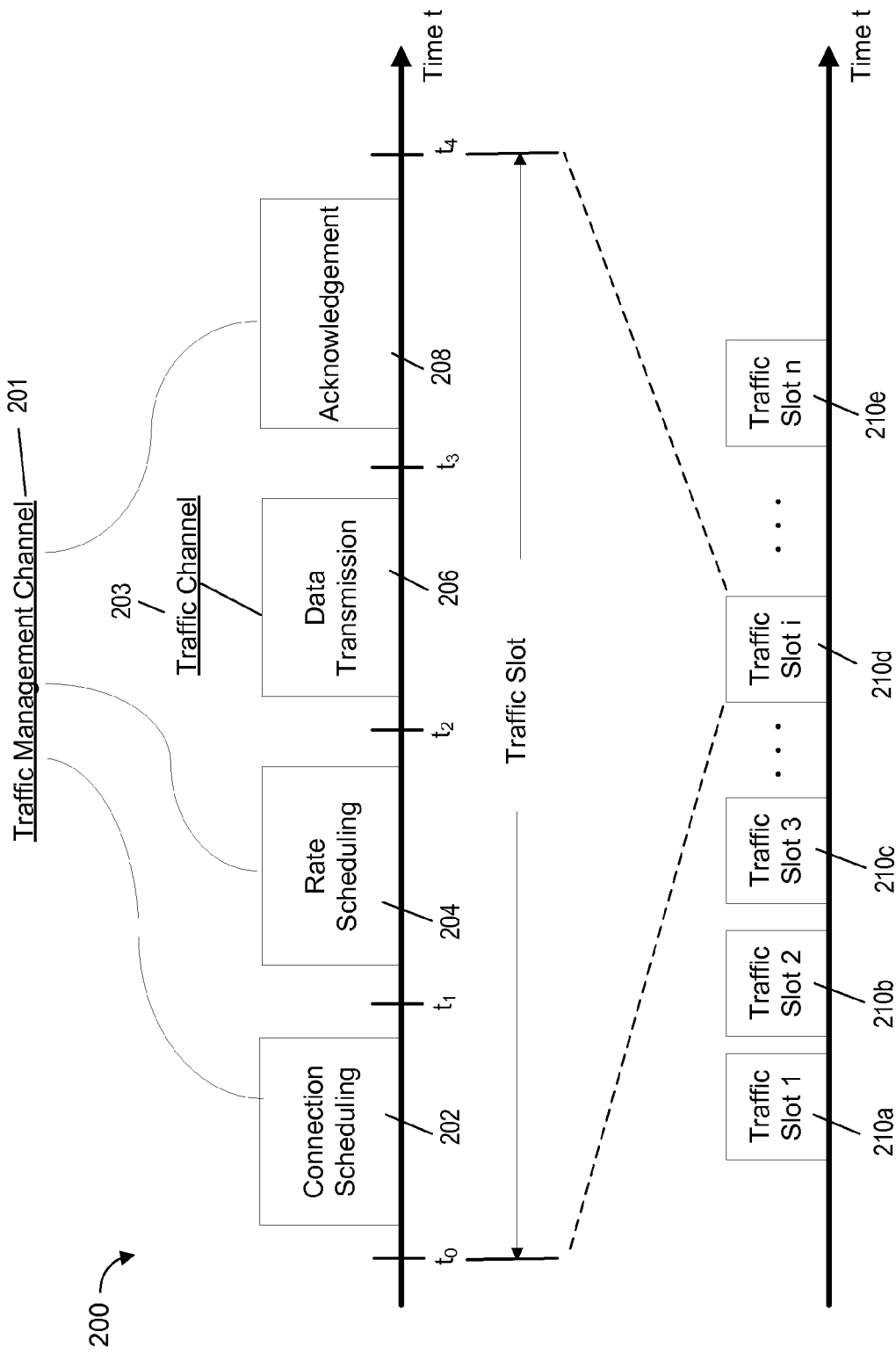
FIG. 2 illustrates one example of a timing sequence that may be used by wireless terminals to establish and/or maintain a peer-to-peer communication connection.

FIG. 2 illustrates one example of a timing sequence for a traffic channel slot that may be used by wireless terminals to transport traffic after a peer-to-peer communication connection has been established between wireless terminals. Each traffic channel slot 210 may include a traffic management channel 201 and a traffic channel 203. The traffic management channel 201 may be used for signaling related to traffic data transmissions in the traffic channel 206. A connection scheduling segment 202, a rate scheduling segment 204, and an acknowledgment segment 208 are collectively referred to as the traffic management channel 201. A data transmission segment 206 may be referred to as the traffic channel 203. The connection scheduling segment 202, the rate scheduling segment 204, the data segment 206 and the acknowledgment 208 shown in FIG. 2 comprise a traffic slot.

The connection scheduling segment 202 may be used by a transmitter terminal to indicate to its receiver terminal (in a peer-to-peer connection) to indicate that it is ready to transmit traffic data. The rate scheduling segment 204 allows the transmitter/receiver terminals (in the peer-to-peer connection) to obtain a transmission rate and/or power to use in transmitting the traffic data. The data transmission segment 206 is then used to transmit the desired traffic data at the obtained transmission rate and/or power. The acknowledgement segment 208 may be used by the receiver terminal to indicate that the traffic data was received or not received in the data transmission segment 206. In one example, the time duration of a traffic slot is approximately two (2) milliseconds. As the traffic slots 210 repeat over time, the time sequence structure shown in FIG. 2 shows one period of the traffic slots. Note that, prior to sending traffic data in the traffic slot 210, the transmitter and receiver terminals may have established a peer-to-peer connection via a control slot 404 (in FIG. 4).

Interference in Peer-to-Peer Networks

In an ad hoc peer-to-peer communication system, multiple communications may take place using frequency spectrum resources shared in both space and time. Because of the distributed nature of the ad hoc peer-to-peer network, it may not always be possible to control the channel allocations (e.g., slots) used for transmissions between the wireless terminals. In wireless networks where a central authority does not exist, interference avoidance and/or management is a key feature to maintain the efficiency of the network performance.

Figure 3:
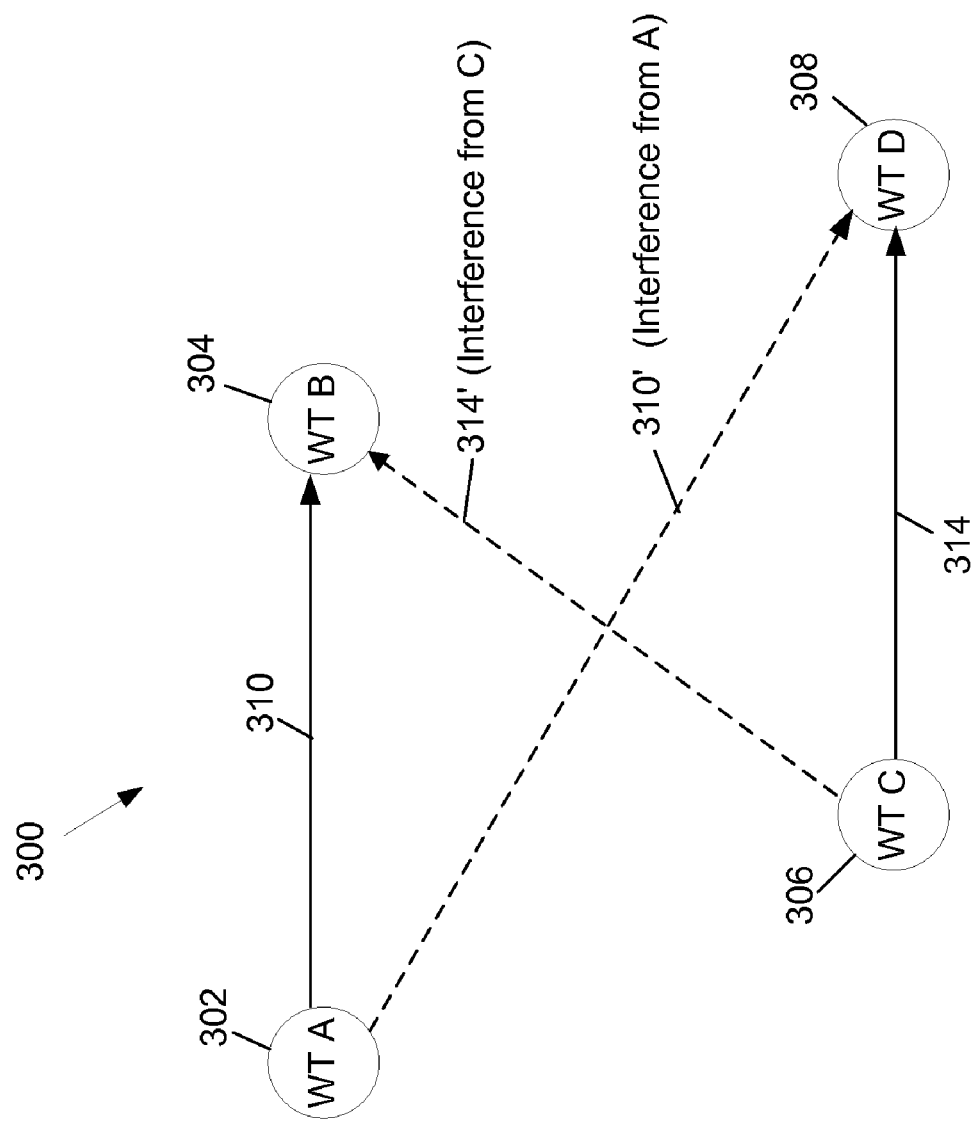
FIG. 3 is a block diagram illustrating an environment in which a plurality of wireless terminals may establish peer-to-peer communication connections that may cause interference to other nearby wireless terminals.

FIG. 3 is a block diagram illustrating an environment in which a plurality of wireless terminals may establish peer-to-peer communication connections that may cause interference to other nearby wireless terminals. A peer-to-peer network 300 may include a plurality of wireless terminals that may share and/or concurrently use a frequency spectrum. The shared frequency spectrum may include one or more transmission and/or control channels, with each transmission (traffic) channel having a corresponding traffic management channel. In one example, the traffic management channel may be used to send a traffic request for communications over a corresponding transmission (traffic) channel.

In one example, a first wireless terminal WT A 302 may be attempting to transmit 310 to a second wireless terminal WT B 304 while a third wireless terminal WT C 306 is concurrently attempting to transmit 314 to a fourth wireless terminal WT D 308 using the same traffic channel bandwidth resource. The first wireless terminal WT A 302 may be referred to as the intended transmitter, the second wireless terminal WT B 304 may be referred to as the intended receiver, and the third wireless terminal WT C 306 may be considered the interferer. In this peer-to-peer network 300, a transmission and control channel pair may be shared by the plurality of the wireless terminals WT A, WT B, WT C, and WT D. However, because such transmission (traffic) and/or control channel is shared (e.g., frequency spectrum sharing) by the wireless terminals, it may also result in unwanted interference 314' and 310' among the wireless terminals. For instance, if both transmissions 310 and 314 actually take place, then the signal 314' from the third wireless terminal WT C 306 may be seen as interference to the second wireless terminal WT B 304 receiver and may degrade its ability to successfully recover the desired signal 310 from the first wireless terminal WT A 302. Therefore, certain interference management protocol is needed to manage interference from the third wireless terminal WT C 306 to the second wireless terminal WT B 304. One goal of the interference management protocol is to allow the third wireless terminal WT C 306 to transmit without creating excessive interference to the second wireless terminal WT B 304, thereby increasing the overall throughput and improving the system performance. Note that in the meantime, the first wireless terminal WT A 302 may also cause interference 310' to the fourth wireless terminal WT D 308, and a similar interference management protocol may also be used to control that interference.

Because there is no centralized traffic management authority, there is a chance that WT A 302 and WT C 306 may transmit on the same or overlapping channel, thereby causing interference with each other. For example, by coincidence, both WT A 302 and WT C 306 may use the same transmission CID. A transmission CID may be used to indicate a particular transmission channel (e.g., frequency or time slot) to a receiving terminal WT B 304 and 308. Consequently, when the same transmission CID is used by two terminals, they may also be concurrently transmitting on the same channel or overlapping channels. If both transmitting terminals WT A 302 and WT C 306 are within range of the receiver terminals WT B 304 and/or WT D 308, then the receiver terminals WT B 304 and/or WT D 308 may perceive interference.

In particular, a way is needed that allows multiple wireless terminals to choose channels within shared frequency without distinguish between transmissions from an intended peer and those from an unintended peer.

Channel Architecture

Figure 4:
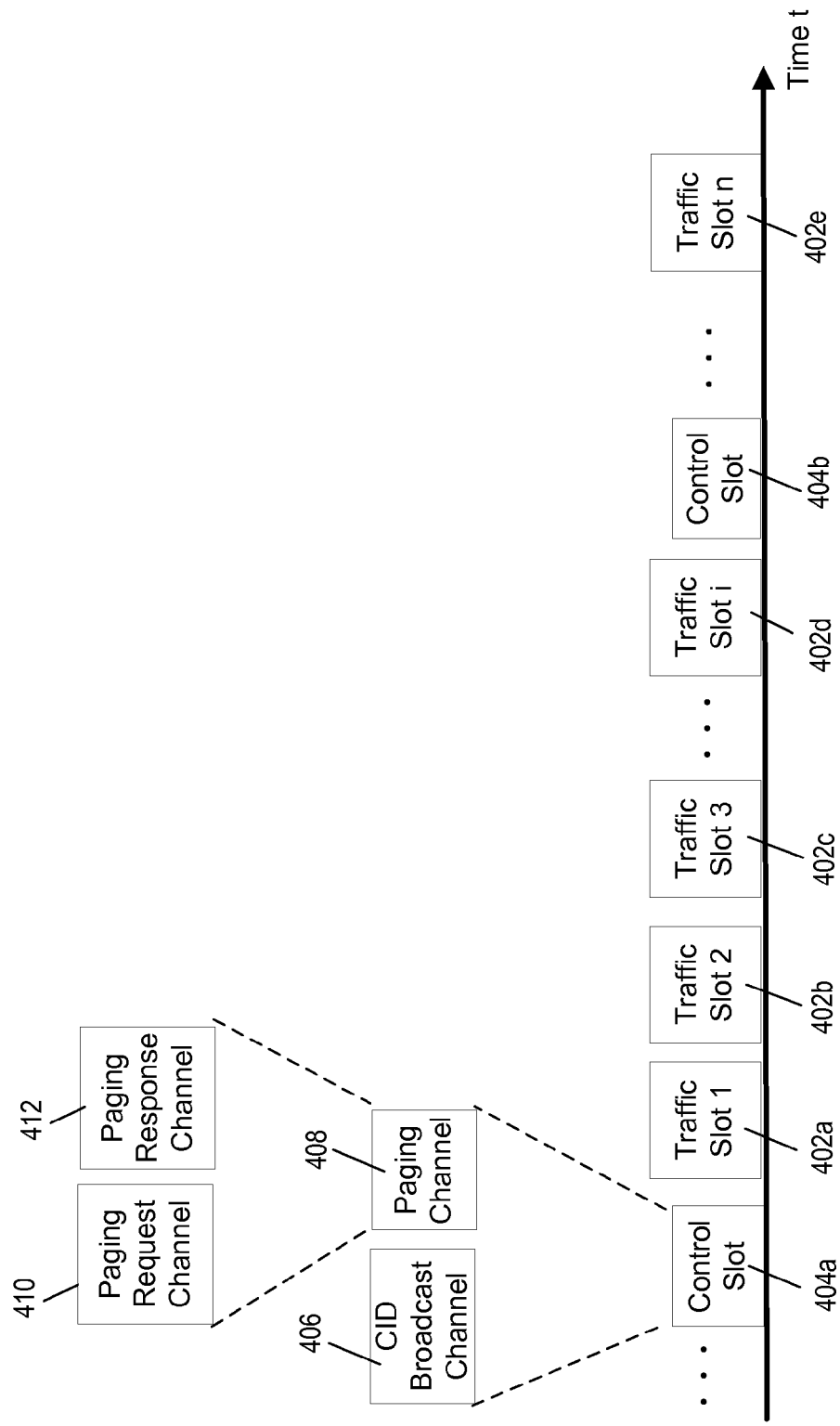
FIG. 4 illustrates one example of a channel architecture in which a control slot in inserted every so often between traffic slots.

FIG. 4 illustrates one example of a channel architecture in which a control slot in inserted every so often between traffic slots. Traffic slots 402 are time intervals during which a transmitter terminal may send peer-to-peer traffic data to a receiver terminal through the transmission channel. In one example, each traffic slot 402 may be as illustrated in FIG. 2. Each traffic slot may be 2 milliseconds (ms) long. A traffic slot 402 may include a traffic channel portion in which data traffic is transmitted and a traffic management channel portion in which scheduling and interference management takes place.

Each control slot 404 may include a CID Broadcast Channel 406 and a Paging Channel 408. The control slot 404 may occur at much longer intervals than traffic slots. For instance, the control slot 404 may occur every second or so. A control slot 404 may serve to establish and maintain a peer-to-peer connection between the transmitter and receiver terminals. The CID Broadcast Channel 406 may be used to indicate those peer-to-peer connection identifiers (CIDs) that are in use by nearby connections and to indicate whether a peer-to-peer connection is still alive. For example, the transmitter and receiver terminals may monitor the CID Broadcast Channel 406 to determine which CIDs are in use. The Paging Channel 408 is used by the transmitter and receiver terminals to establish new CIDs for a new peer-to-peer connection and may include a Paging Request Channel 410 and a Paging Response Channel 412. The control slots 404 may occur at much longer intervals than traffic slots 402. For instance, the control slots 404 may occur every second or so.

Figure 5:
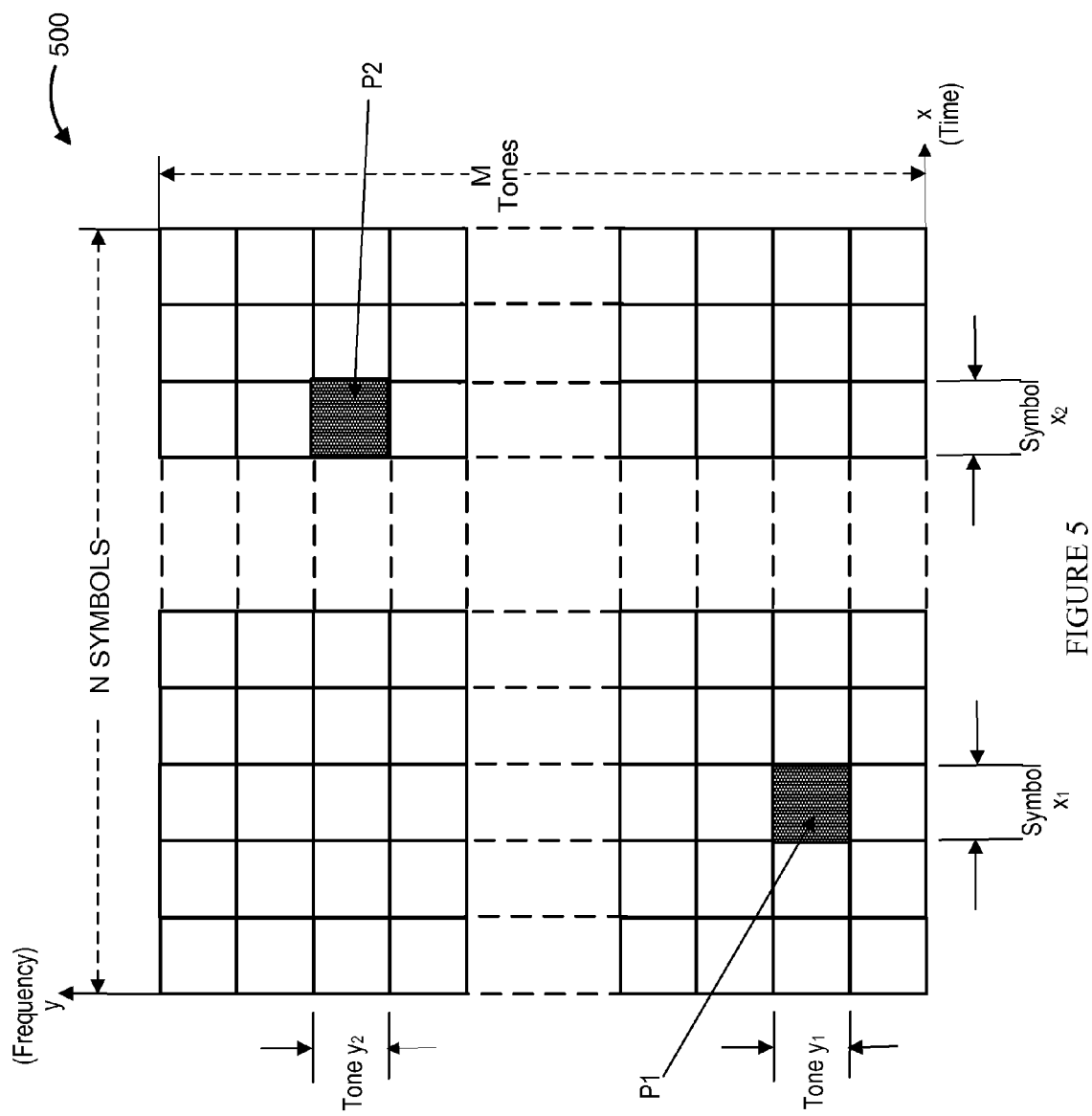
FIG. 5 illustrates an example time-frequency grid associated with a signal transmission.

FIG. 5 illustrates an example time-frequency grid 500 associated with a signal transmission. The exemplary signal may be an OFDM signal. The time-frequency grid 500 is the resource available for transmitting and/or receiving signals over a peer-to-peer network, e.g., during a control or traffic channel time interval. The x-axis represents time and may include N symbols (e.g., where N may be any integer), and the y-axis represents frequency and may include M tones (e.g., where M may be any integer).

A CID resource unit may be defined by a time-frequency combination or symbol-tone combination. According to an example, in a control slot or a traffic management portion of a traffic slot, a wireless terminal may select a particular symbol (e.g., transmission time) for transmission based upon an identifier of the wireless terminal or a user who is utilizing the wireless terminal and/or a time variable (e.g., time counter) that may be commonly understood within a peer-to-peer network to identify the current slot interval. Further, a particular tone corresponding to the selected symbol may be determined (e.g., based upon the identifier and/or time variable). Pursuant to a further example, a hash function of the identifier and the time variable may yield the selected symbol position and/or tone position. For example, for a given connection, when the time variable takes a first value, the hash function may yield symbol $x_1$ and tone $y_1$ such that the wireless terminal transmits a single-tone signal $P_1$ as shown in FIG. 5 as the CID resource unit. When the time variable takes a second value, the hash function may yield symbol $x_2$ and tone $y_2$ such that the wireless terminal transmits a single-tone signal $P_2$ as shown in FIG. 5 as the CID resource unit.

Hybrid Peer-to-Peer Transmission CID Space

A method is provided for generating hybrid transmission CIDs from a first set of orthogonal transmission CIDs and a second set of non-orthogonal transmission CIDs. A transmission CID space is subdivided into a first set of orthogonal transmission CIDs and a second set of non-orthogonal transmission CIDs. When a transmitter terminal intends to transmit to its peer receiver terminal, it selects a transmission CID from one of the first set of orthogonal transmission CIDs and the second set of non-orthogonal transmission CIDs. For example, the transmitter terminal may first try to select an unused orthogonal transmission CID from the first set of transmission CIDs. If a collision of the selected orthogonal transmission CID is detected, the first device may select a non-orthogonal transmission CID from the second set of non-orthogonal transmission CIDs.

As used herein, the term "orthogonal" refers to CIDs that are selected so as to ensure that others are not currently using the same CID. Such orthogonal CID may be achieved by first checking the CIDs that are in use by other connections (e.g., by monitoring a CID broadcast channel), selecting a CID that is unused or available, and switching CIDs if a collision is detected. By contrast, a "non-orthogonal", "pseudo-random", and/or "random" CID refers to the fact that for any given traffic slot, CIDs are not necessarily checked for collision avoidance. Instead a CID is selected from a set of "non-orthogonal" CIDs without regard as to whether it is in use by another connection.

Figure 6:
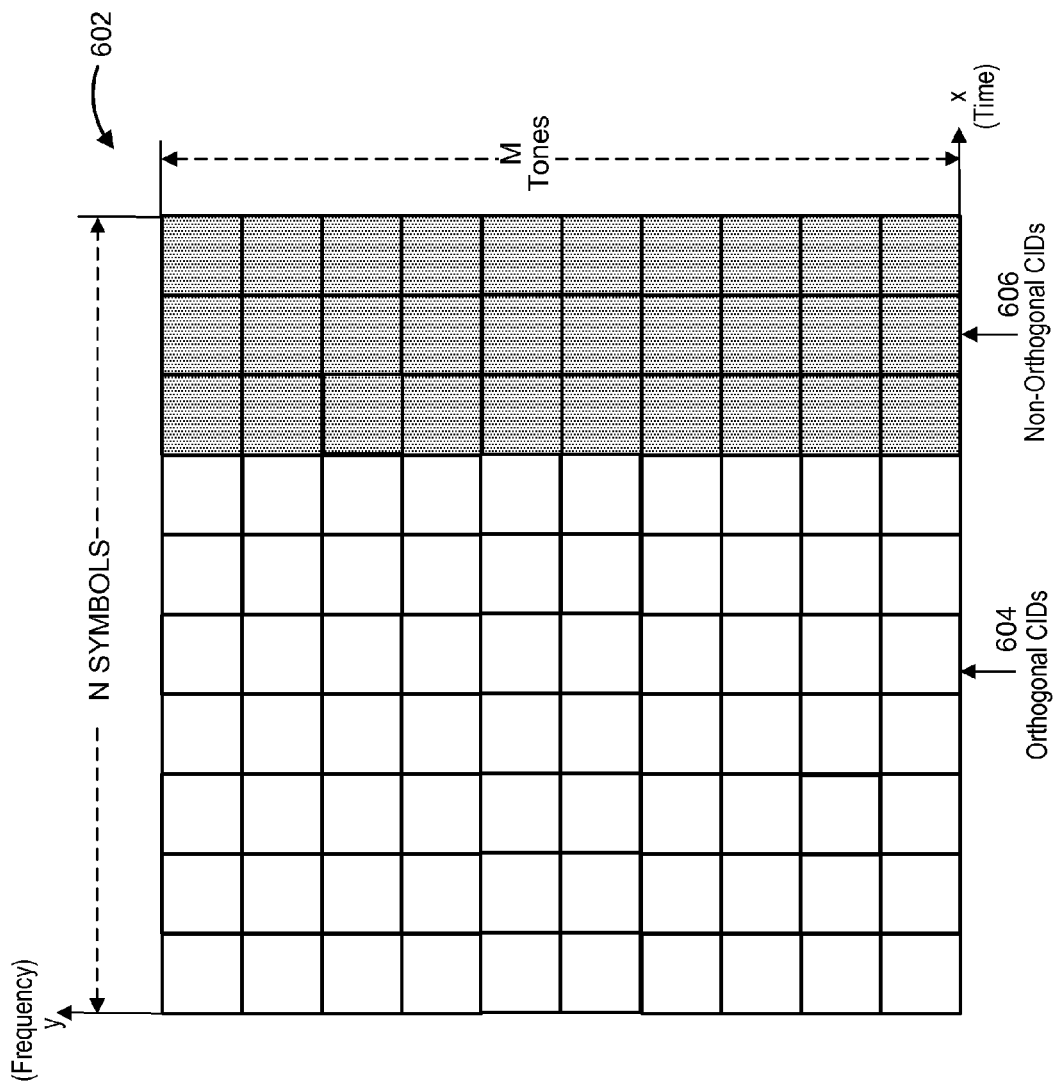
FIG. 6 illustrates a hybrid transmission CID space or resource in which a set of transmission CIDs has been subdivided into a first set of orthogonal transmission CIDs and a second set of non-orthogonal transmission CIDs.

FIG. 6 illustrates a hybrid transmission CID space or resource 602 in which a set of transmission CIDs has been subdivided into a first set of orthogonal transmission CIDs 604 and a second set of non-orthogonal transmission CIDs 606. The first and second subsets of transmission CIDs 604 and 606 are non-overlapping. As used herein, the term "orthogonal" is used to indicate that a transmission CID from this sub-set is selected by checking if it is in use by another connection in its neighborhood and choosing the transmission CID only if it is unused by another connection. Meanwhile, the term "non-orthogonal" is used to indicate that a transmission CID from this sub-set is randomly or pseudo-randomly selected without necessarily checking whether it is currently being used by another connection. In one example, the transmission CID space or resource 600 includes a plurality of transmission resource units, where each unit is defined as a symbol/tone combination from among N symbols and M tones. Note that because the first and second sub-sets 604 and 606 are non-overlapping, the orthogonality between the first sub-set of orthogonal transmission CIDs 604 and the second sub-set of non-orthogonal transmission CIDs 606 is preserved. Consequently, if a transmission CID is selected from the first set of orthogonal transmission CIDs 604 and a second transmission CID is selected from the second set of non-orthogonal transmission CIDs 606, these transmission CIDs are never going to collide into each other during transmission.

In one implementation, a traffic management channel slot or time interval may be partitioned into a first subset and a second subset of symbols and tones, similar to what is shown in FIG. 6. Such partitioning may be predetermined and independent of a selected connection identifier. When a transmitter/receiver pair select their CID the orthogonal CID subset, the CID maps to a dedicated tone and symbol combination in the first subset, where no other transmitter/receiver pairs in the vicinity may utilize that dedicated tone and symbol combination. On the other hand, when a transmitter/receiver pair select their CID the non-orthogonal CID subset, in effect the transmitter/receiver pair may utilize a tone and symbol combination in the second subset, where it is possible that another transmitter/receiver pair in the vicinity may utilize that tone and symbol combination in a given traffic management channel slot. In one embodiment of utilizing a non-orthogonal CID, the transmission (connection) CID may also change over time in a pseudo-random fashion which may be different between different transmitter/receiver pairs. With this property, two transmitter/receiver (Tx/Rx) pairs are not likely to use the same transmission (connection) CID for consecutive time intervals.

The set of non-orthogonal ("random") transmission CID 606 can be used for multiple purposes. For example, one issue associated with the set of orthogonal transmission CIDs 604 space is robustness. If for any reason, two terminals end up with the same transmission CID from the set of orthogonal transmission CIDs 604, as they keep on using the same CID, their transmissions will keep on colliding for some time before collision can be detected. To improve this, the set of non-orthogonal (random) transmission CIDs can be used as a safety net for terminals when CID collisions occur. Whenever a terminal detects a transmission CID collision, it changes to use a non-orthogonal transmission CID until the next slot or time interval where a new orthogonal transmission CID can be obtained. One advantage of using non-orthogonal (random) transmission CIDs is that it can be generated instantaneously without trying to listening to other transmission CIDs in the neighborhood. Thus, for terminals that are in a hold state and wanting to resume their transmissions, these terminals can start transmissions using a non-orthogonal (random) transmission CID right away without listen for the next broadcast CID channel or period to figure out if a particular transmission CID is currently in us by another connection. In an alternative implementation, each transmitter/receiver pair can hold onto their orthogonal transmission CID when they go to the hold state. However, one downside of this scheme is that when they wake up, other terminals may be using their transmission CID and which results with an orthogonal CID collision.

Hybrid Transmission CID Space Infrastructure

When a transmitter terminal wants to initiate communications with a certain neighboring receiver terminal, it first selects one or more transmission CIDs which are not used in its neighborhood. In a synchronous wireless network, this can be achieved by introducing a CID broadcast period 704 in a slow time scale, e.g., once every second. In general, it makes sense to make the CID broadcast period the same as the paging period 706, where terminals ping each other to start the conversation.

Figure 7:
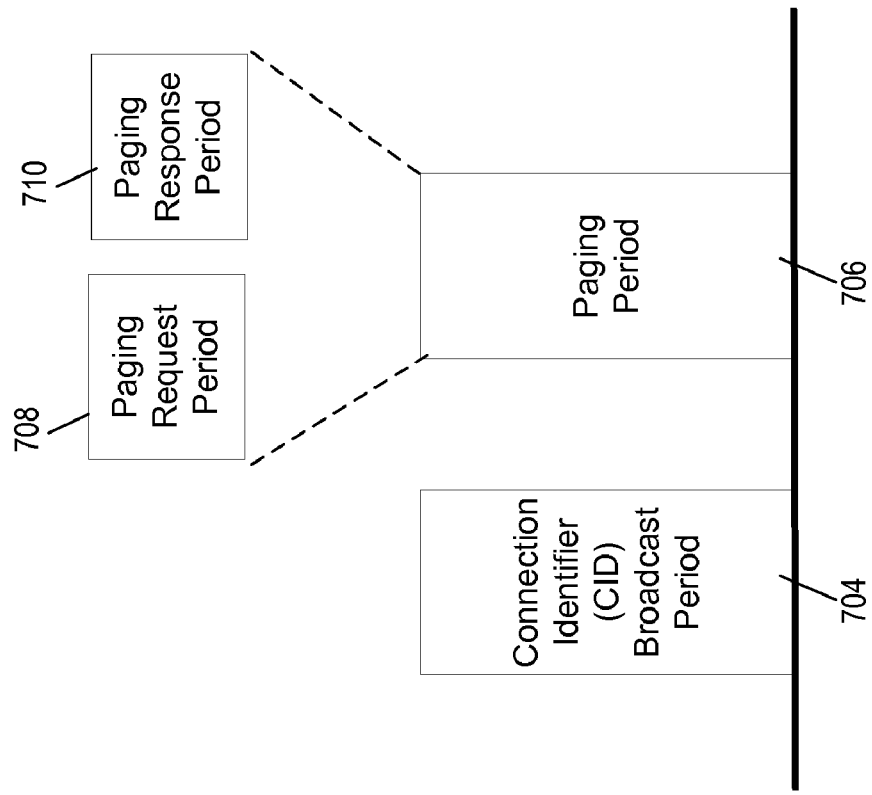
FIG. 7 illustrates one example of a timing sequence for CID broadcast including a CID broadcast period, and a paging period.
Figure 7:
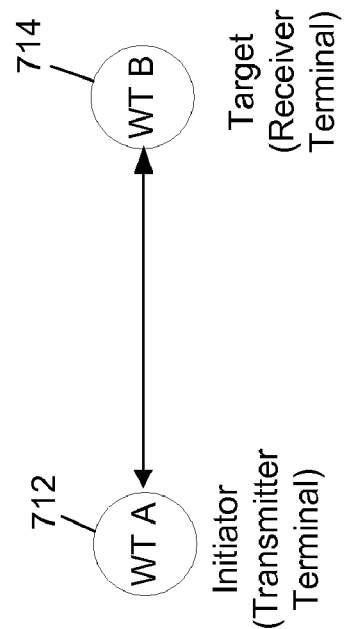
Figure 8:
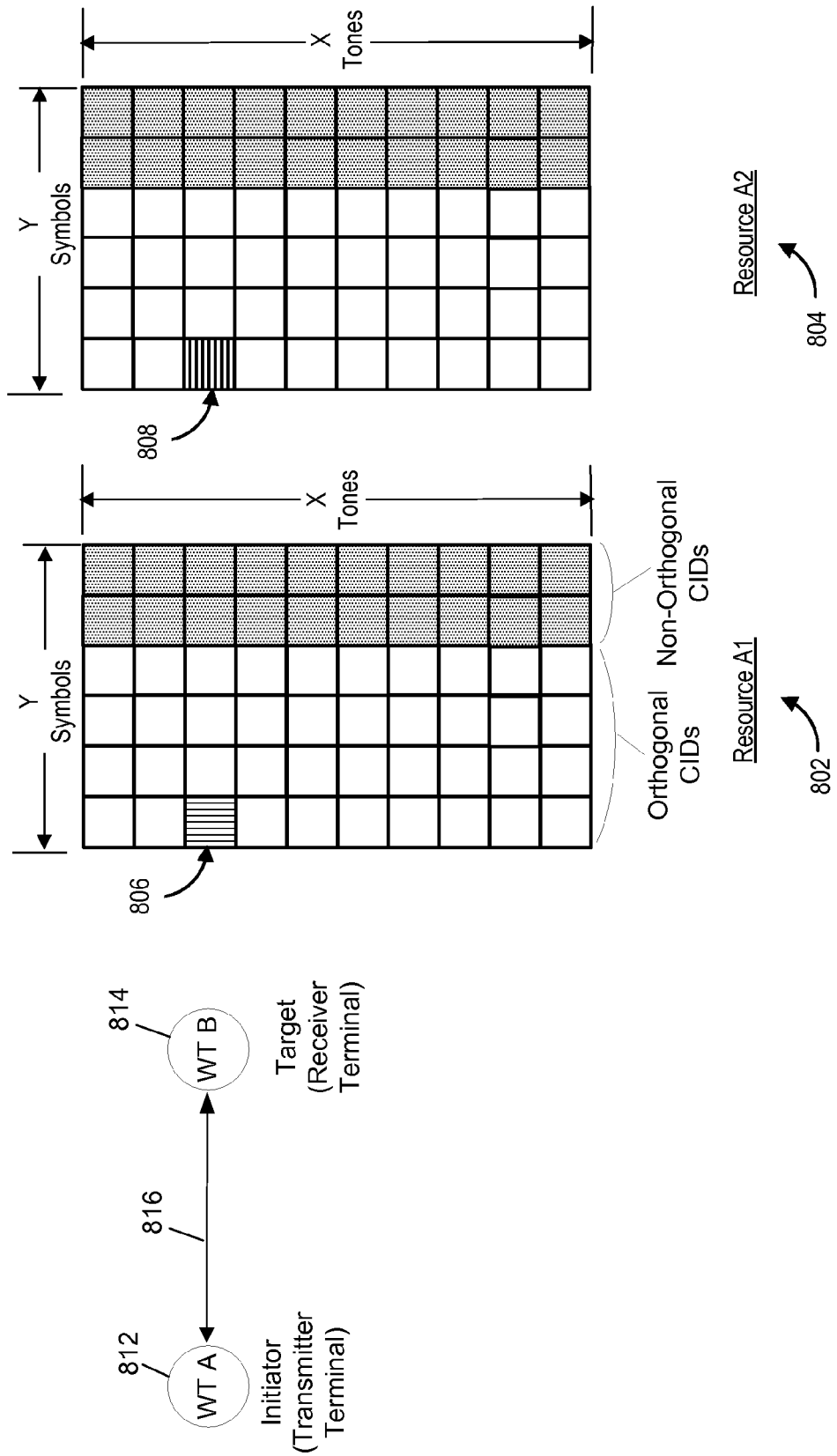
FIG. 8 illustrates one example of a two-part CID broadcast structure where each part covers the whole transmission CID space.
Figure 9:
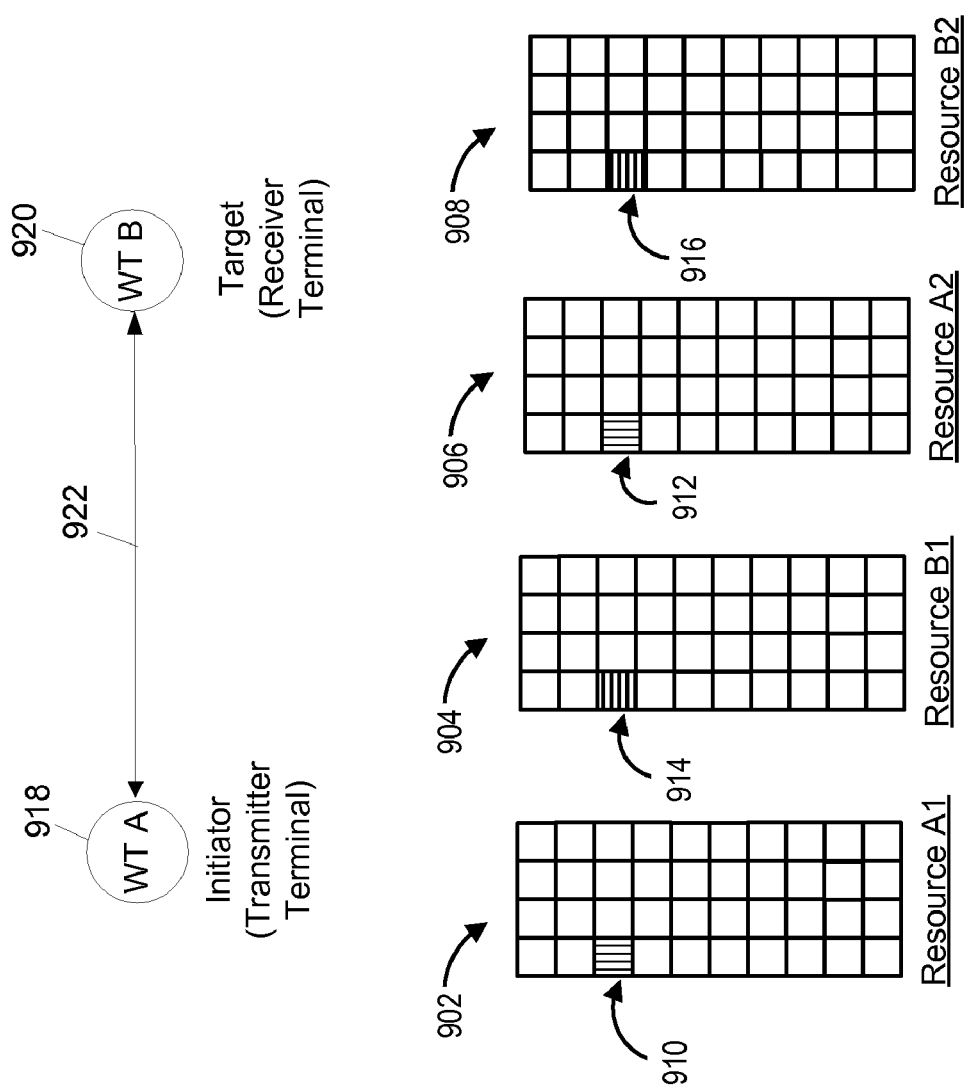
FIG. 9 illustrates one example of a four-part CID broadcast structure to enable detection of CID collision.

Note that the CID broadcast resources illustrated in FIGS. 7, 8 and 9 that follow represent the subset of orthogonal of transmission CIDs of a hybrid transmission CID space or resource. For sake of clarity, the subset of non-orthogonal transmission CIDs is not illustrated in these figures. In one embodiment, in the CID broadcast channel, only orthogonal CIDs have dedicated space, and only terminals using orthogonal CIDs broadcast their CIDs in the CID broadcast channel. Non-orthogonal CIDs do not need to be broadcasted.

FIG. 7 illustrates one example of a timing sequence for CID broadcast including a CID broadcast period 704, and a paging period 706. In the CID broadcast period 704, a terminal that has already had a CID, in particular, an orthogonal CID, broadcasts its CID so that other terminals in the vicinity become aware that the particular CID has been occupied.

After the CID broadcast period 704, a paging period 706 occurs. The paging period 706 may include a paging request period 708 and a paging response period 710. A paging initiator 712 (e.g., transmitter terminal WT A) sends a paging request to the paging target 714 (e.g., receiver terminal WT B) in the paging request period 708. The paging target 714 then sends a paging response back to the paging initiator 712 in the paging response period 710. One purpose of the paging request and response exchange is to establish a connection between the paging initiator 712 and paging target 714. The paging initiator and target select a connection ID (CID) to be used by the two terminals in the subsequent traffic slots for exchanging other control and/or data traffic. To avoid interference and/or CID collisions with other neighboring connections, it is preferable that the CID selected by the paging initiator 712 and target 714 is not currently occupied or used by other terminals.

Therefore, the paging initiator and the paging target monitor the CID broadcast period 704 in order to detect which CIDs are not occupied in the vicinity. Note that a CID may be reused by different connections in geographic locations remote from each other, i.e., spatial reuse. To determine whether a CID is occupied or not, the paging initiator 712 or target 714 may monitor the signal corresponding to the CID in the CID broadcast period and measure the signal strength. The paging initiator 712 and/or target 714 may compare the signal strength with a threshold. The value of the threshold may be fixed, or determined as a function of a measurement of the background noise. Alternatively, the paging initiator and/or target may compare the strength of the signal corresponding to the CID with the strength of the signals corresponding to other CIDs.

Note that the paging initiator 712 and the target 714 may independently monitor the CID broadcast period 704 and determine which CIDs are not occupied in the vicinity. Because the radio frequency (RF) condition may be different at the paging initiator and the target, the list of available CIDs determined by the initiator or the target may be different. In one embodiment, the paging initiator 712 may determine one or more available CIDs based on its measurement during the CID broadcast period 704. The paging initiator 712 sends a list of available CIDs to the target 714 in the paging request period 708. The paging target 714 may determine one or more available CIDs based on its measurement during the CID broadcast period 704, compare them with the list received in the paging request period 708, and select one CID out of the list from the paging initiator 712 to use. The selected CID is desirably the one that both the paging initiator 712 and target 714 consider to be available. The paging target 714 then informs the initiator 712 the selected CID in the paging response period 710.

Whether or not a CID is considered available (i.e., not occupied) is based on signal strength measurement in the CID broadcast period 704. The initiator 712 and/or target 714 may associate each available CID with some quality indicator, which indicates the extent to which the initiator 712 or target 714 considers the CID available. For example, if the received signal strength corresponding to a first CID is less than that of a second CID, then the initiator 712 or target 714 may determine that the first CID is "more" available than the second CID, which is reflected in the quality indictors associated with the first and the second CIDs. Furthermore, the initiator 712 may rank the available CIDs according to the associated quality indicator, and accordingly determine the list to send to the target 714. The initiator 712 may also include the quality indicator in the paging request message (sent in during the paging request period 708).

In the case where the available CIDs proposed by the initiator 712 are all considered "occupied" by the target 714, rather than select one out of the list from the initiator (transmitter terminal), the target 714 may further propose other CIDs to be used. A few iterations may take place between the initiator and the target (transmitter and receiver terminals) before the two terminals converge on the particular CID to be used.

It is appreciated that there are multiple ways of designing the CID broadcast period 704 since this happens in a slow time scale and the overhead is of less a constraint.

FIG. 8 illustrates one example of a traffic management channel utilizing orthogonal and non-orthogonal CIDs. For example, in a traffic slot, the traffic management channel portion may include a resource portion A1 802 used for signaling transmission request from a transmitter terminal to a receiver terminal and a resource portion A2 804 used for signaling request response from a receiver terminal to a transmitter terminal. Assuming the total transmission CID space spans from 1 to N, each resource A1 802 and A2 804 in FIG. 8 may have N degrees of freedom. For example, each resource A1 and A2 may include X tones in Y OFDM symbols, where N=X*Y. Part of each resource A1 and A2 may be subdivided such that part of the resource is allocated to be used by terminals whose CIDs are orthogonal while the other part of the resource is allocated to be used by terminals whose CIDs are non-orthogonal.

Suppose that first and second terminals 812 and 814 are associated with a connection 816 that has already had a CID. The connection 816 may have been previously established between the two terminals. Suppose that in the present traffic slot, the first terminal 812 is the transmitter and the second terminal 814 is the receiver.

If the CID of the connection is an orthogonal CID, then, the CID maps to a first dedicated tone and symbol combination 806 in resource A1 and a second dedicated tone and symbol combination 808 in resource A2. The first terminal may use the first dedicated tone and symbol combination 806 to indicate a transmission request to the second terminal. The second terminal may use the second dedicated tone and symbol combination 808 to indicate a request response to the first terminal. Because the CIDs are orthogonal, terminals of other connections in the vicinity are not allowed to utilize the first and second tone and symbol combinations.

If the CID of the connection is a non-orthogonal CID, then, the CID maps to a first shared tone and symbol combination in the shadowed portion of resource A1 and a second shared tone and symbol combination in the shadowed portion of resource A2. The first terminal may use the first shared tone and symbol combination to indicate a transmission request to the second terminal. The second terminal may use the second shared tone and symbol combination to indicate a request response to the first terminal. Because the CIDs are non-orthogonal, terminals of other connections in the vicinity are allowed to utilize the first and second tone and symbol combinations. Mapping between the connections to the shadowed portion of resources A1 and A2 is random or pseudo-random and changes over time, e.g., from one traffic slot to another. Therefore, if the first and second terminals share tone and symbol combinations with terminals of another connection in one traffic slot, they may not keep on sharing tone and symbol combinations in consecutive traffic slots.

FIG. 9 illustrates one example of a four-part CID broadcast structure to enable detection of CID collision. Each resource covers the whole orthogonal transmission CID space. Each orthogonal transmission CID within the orthogonal transmission CID space is defined (or associated with) a particular tone/symbol or frequency-time that corresponds to a transmission traffic channel. For example, assuming the transmission CID space spans from 1 to N, each CID broadcast resource A1 902, A2 904, B1 906, and B2 908 may have N degrees of freedom. In a connection between a first terminal 918 and a second terminal 920, suppose that the first terminal 918 was the one that initiated the connection 922 (i.e., paging initiator) and the second terminal 920 was the paging target. In one example, the first terminal 918 is assigned to resources A1 902 and B1 904, while the second terminal 920 is assigned to resources A2 906 and B2 908. Such assignment of resources may be implied, where for example, the initiator terminals know that they should use resources A1 902 and B1 904 while the target terminals know that they should use resources A2 906 and B2 908. Note that different assignments of resources to the first and second terminals 918 and 920 are also possible.

The first terminal 918 may select one of the two resources A1 902 and B1 904 to send a signal corresponding to the CID of the connection 922 between the first and the second terminals 918 and 920. The first terminal 918 may then listen on the non-selected resource to determine if another terminal is using the same transmission CID. For example, the first terminal 918 may select to transmit a CID broadcast signal 910 defined by a location (tone/symbol) within the CID space in resource A 902, while listening at position 914 (i.e., resource unit) in resource B1 904 for collisions. If the first terminal 918 detects that a CID broadcast signal is sent in position 914, the first terminal 918 may conclude that another terminal may also be using the same CID, i.e., CID collision is detected. Similarly, the second terminal 920 may select one of the two resources A2 906 and B2 908 to send a signal corresponding to the CID of the connection 922 between the first and the second terminals 918 and 920. For example, the second terminal 920 may select to transmit a CID broadcast signal 912 defined by a location within the CID space in resource A2 906.

At any particular CID broadcast period, the selection of one resource over another resource (e.g., between resources A1 and B1) may be pseudo-randomly determined as a function of terminal or device IDs of the first and/or second terminals. For example, the first terminal 918 may use its device ID and a pseudo-random function to determine which resource to select between resources A1 902 and B1 904, while the second terminal 920 may use its device ID and the same pseudo-random function to determine which resource to select between resources A2 906 and B2 908. The selection may also be determined as a function of a time counter. For instance, the first and the second terminals 918 and 920 may derive the value of the time counter from a common timing source. This way, the selection varies as the time evolves.

In a preferred embodiment, the first terminal 918 knows which resource (either A2 or B2) the second terminal 920 will select between A2 906 and B2 908. This is possible because the first terminal 918 has the connection 922 with the second terminal 920 and knows how the second terminal 920 may select. For example, the second terminal 920 may select to transmit a CID broadcast signal in resource A2 906. As described in FIG. 7, in order to check the presence of the second terminal 920, the first terminal 918 monitors to see whether a CID broadcast signal 912 corresponding to the CID has been received in resource A2 906. If so, the first terminal 918 may conclude that the connection 922 is still alive. No further action is needed. Otherwise, the first terminal 918 may conclude that the connection 922 is lost and the first terminal 918 may then tear down the connection 922 and relinquish the CID by restraining from transmitting CID broadcast signals in positions 910 and 914 corresponding to the CID. Moreover, the first terminal 918 monitors to whether a CID broadcast signal 916 corresponding to the CID has been received in resource B2 908. If so, the first terminal 918 may conclude that another terminal may also use the same CID, i.e., CID collision is detected. The first terminal 918 may inform the second terminal 920 of such CID collision so that their connection 922 may need to change to a different CID.

Note that, in one example, the first and second terminals 918 and 920 may periodically, pseudo-randomly, or randomly select between their resources A1 902, A2 904, B1 906, and B2 908. By periodically, pseudo-randomly, or randomly changing the resource used at a particular time interval, the chances of detecting collision are improved. That is, while it may be possible that the first terminal and yet another terminal may select the same transmission CID in the same resource for a particular time interval, it is less likely that they will continually choose the same resource when each independently selects between the two resources every so often.

Hybrid Peer-to-Peer Transmission CID Scheme

Figure 10:
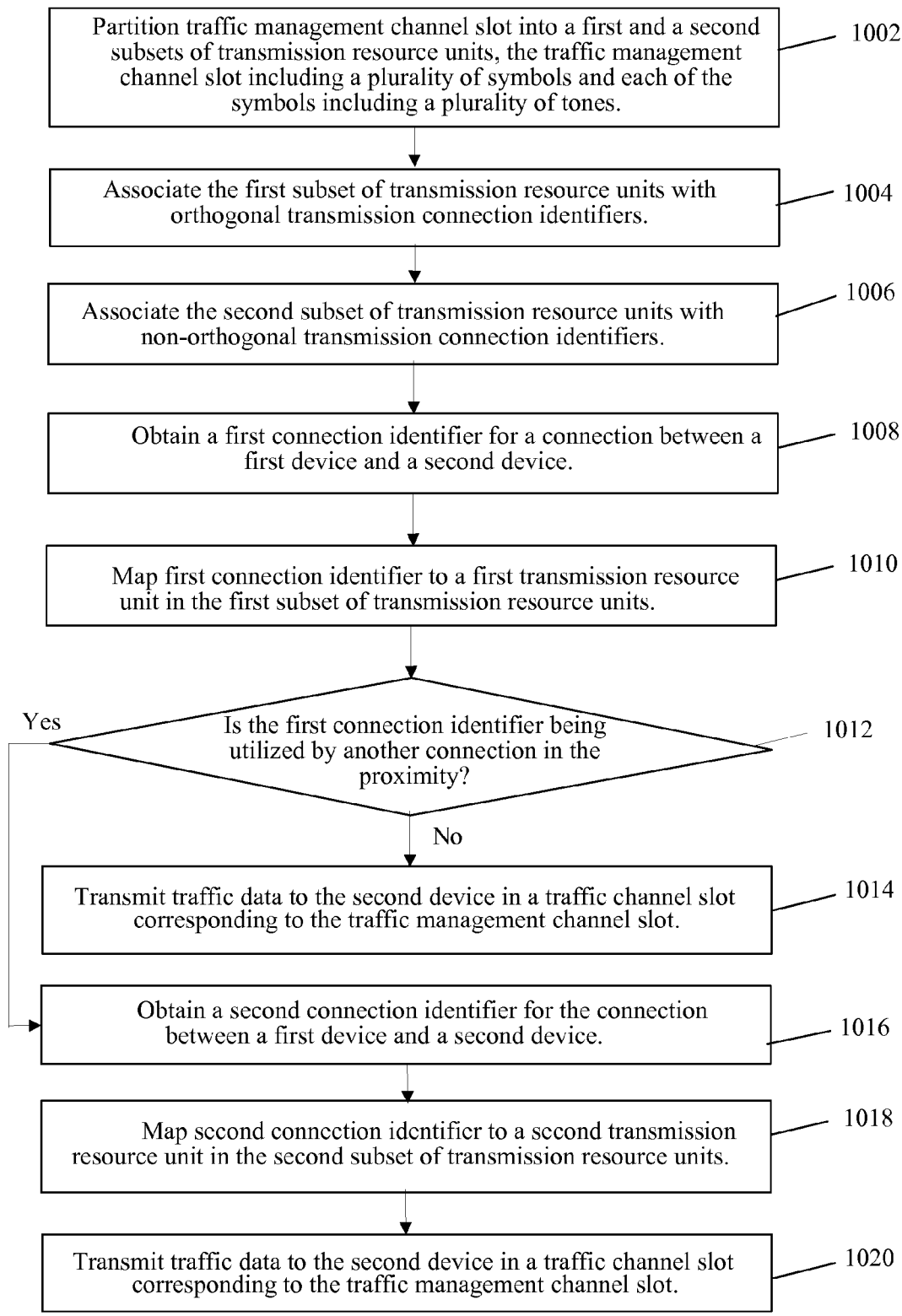
FIG. 10 is a method illustrates a general method of allocating and using orthogonal and non-orthogonal transmission connection identifiers within a peer-to-peer communication connection between terminals.

FIG. 10 is a method illustrates a general method of allocating and using orthogonal and non-orthogonal transmission connection identifiers within a peer-to-peer communication connection between terminals. A traffic management channel slot is partitioned into a first subset and a second subset of transmission resource units, the traffic management channel slot including a plurality of symbols and each of the symbols including a plurality of tones 1002. The first subset of transmission resource units may be associated with orthogonal transmission connection identifiers 1004. The second subset of transmission resource units may be associated with non-orthogonal transmission connection identifiers 1006. A first connection identifier is then obtained for a connection between a first device and a second device 1008. The first connection identifier is mapped to a first transmission resource unit in the first subset of transmission resource units 1010. A determination is made as to whether the first connection identifier is being utilized by another connection in the proximity 1012. If not, traffic data is transmitted from the first device to the second device in a traffic channel slot corresponding to the traffic management channel slot 1014. Otherwise, a second connection identifier is obtained for the connection between a first device and a second device 1016. The second connection identifier is mapped to a second transmission resource unit in the second subset of transmission resource units 1018. Traffic data is then transmitted to the second device in a traffic channel slot corresponding to the traffic management channel slot 1020.

Figure 11A:
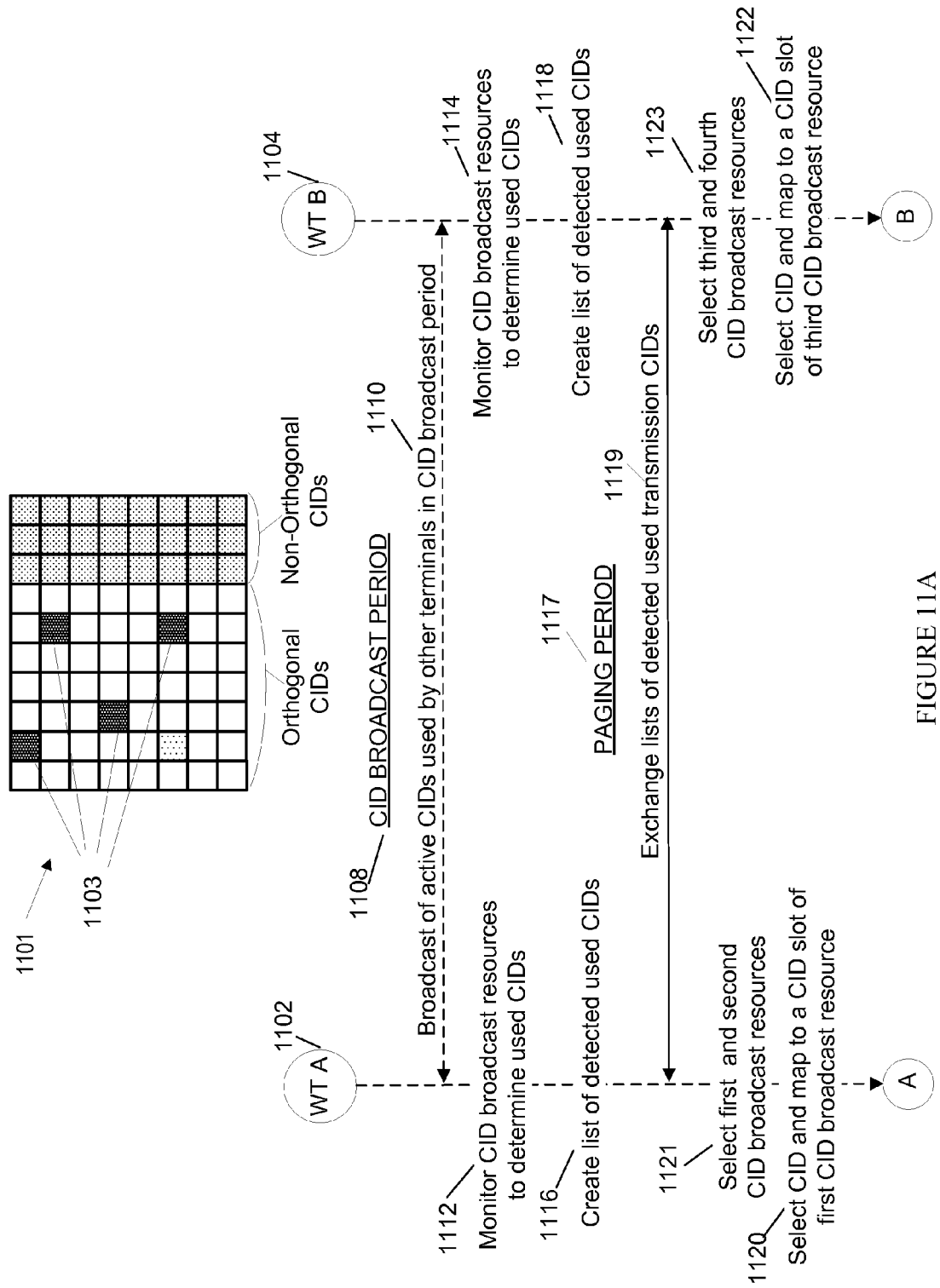
FIG. 11 (comprising FIGS. 11A, 11B, and 11C) is a block diagram illustrating the use of hybrid transmission IDs within a peer-to-peer communication connection between terminals.
Figure 11B:
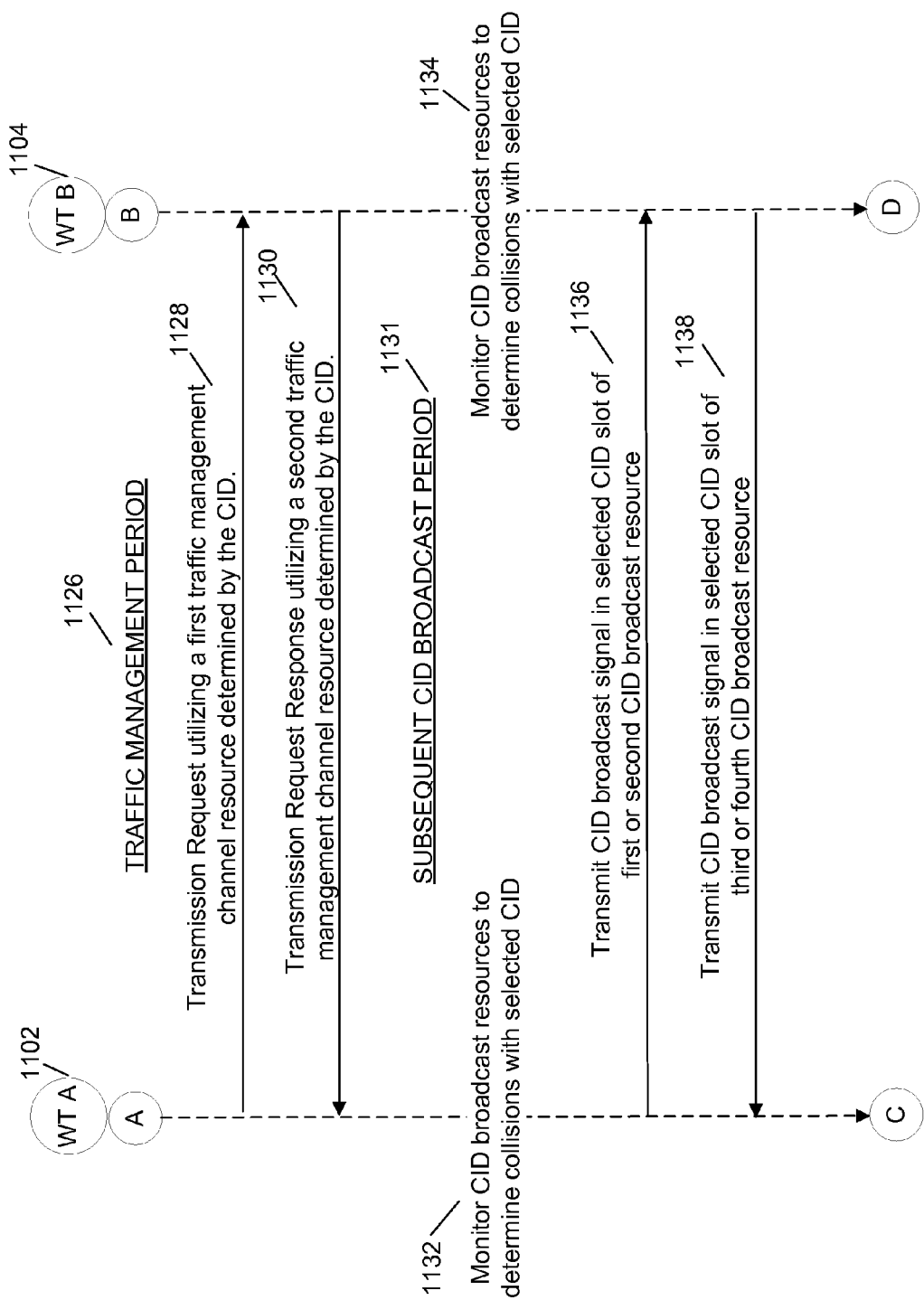
Figure 11C:
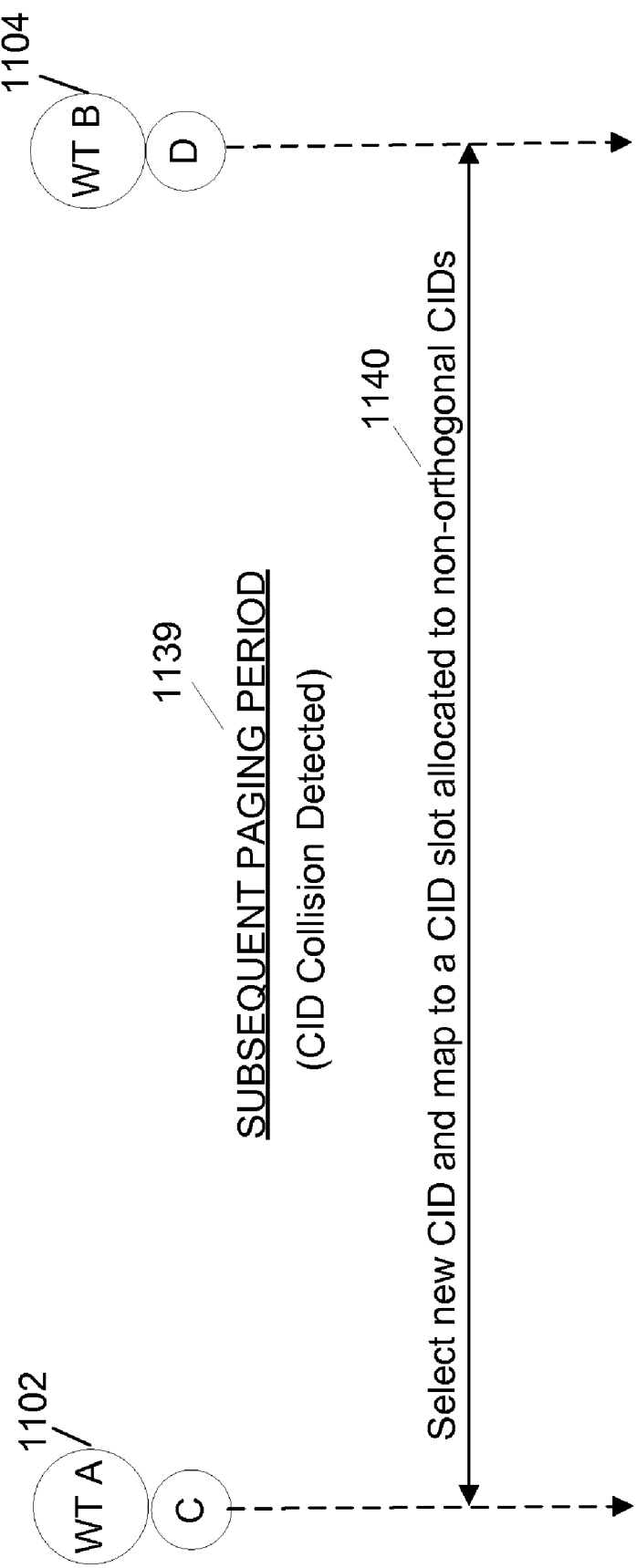

FIG. 11 (comprising FIGS. 11A, 11B, and 11C) is a block diagram illustrating the use of hybrid transmission IDs within a peer-to-peer communication connection between terminals.

In establishing a peer-to-peer communication connection, a first terminal WT A 1102 and a second terminal WT B 1104 may utilize a transmission CID space or resource that is logically or conceptually divided into a first set of orthogonal transmission CIDs and a second set of non-orthogonal transmission (connection) IDs. The first set of hybrid transmission CIDs may be exemplified by the CID broadcast resources illustrated in FIGS. 6, 7, 8 and/or 9.

During a CID broadcast period 1108, neighboring terminals that currently have active connections indicate the CIDs 1103 they are using by sending a tone at a symbol (in a selected CID broadcast resource 1101) corresponding to their selected transmission CID 1110. The first terminal WT A 1102 and second terminal WT B 1104 may monitor the CID broadcast(s) (e.g., CID broadcast resources) to determine which CIDs are used by others 1112 and 1114. Each terminal WT A 1102 and WT B 1104 may then independently create lists of the detected used transmission CIDs 1116 and 1118. Note that due to the difference in their respective RF conditions, the two lists may be different since one terminal may be able to detect some used transmission CIDs that the other terminal does not. The terminals WT A 1102 and WT B 1104 may then exchange their lists of detected transmission CIDs 1119, for example, during the paging period 1117 (also illustrated in FIG. 7).

During a paging period 1117 (shown in FIG. 7), the terminals WT A 1102 and WT B 1104 may select an unused transmission CID in the CID broadcast resource structure 1120 and 1122. Note that, when using the hybrid CID resource 1101, one example provides for the terminals WT A 1102 and WT B 1104 to try to select a CID from the set of orthogonal CIDs first. If after one or more attempts at finding an unused CID in the set or orthogonal CIDs fail, the terminals WT A 1102 and WT B 1104 may pseudo randomly select a CID from the set of non-orthogonal CIDs.

In various examples, each device may have a unique device identifier IDi. For instance, the first device WT A 1102 may be identified by a first identifier $ID_A$, and the second device WT B 1104 may be identified by a second identifier $ID_B$. In this sense, the device identifiers may be "unique" if they are assigned from a very large number of possible identifiers such that the probability of two devices having the same identifier is small (e.g., less than one percent). The transmission CIDs may be obtained as a function of the device identifiers for the Tx/Rx pair and, optionally, a time varying value t.

The first terminals 1102 may also select a first and second CID broadcast resources 1121, where one of the two CID broadcast resources can be used to transmit a CID broadcast signal while the other may be used to monitor for CID collisions. Similarly, the second terminal 1104 may also select a third and fourth CID broadcast resource 1123, where one of the two CID broadcast resources can be used to transmit a CID broadcast signal while the other may be used to monitor for CID collisions.

Having selected a transmission CID for their peer-to-peer connection, during a traffic management period 1126, the first wireless terminal WT A 1102 may then transmit a transmission request to the second terminal WT B 1104, utilizing a first traffic management channel resource determined by the CID 1128. Upon receiving this transmission request, the second terminal WT B 1104 then sends a request response utilizing a second traffic management channel resource determined by the CID 1130. The first and second traffic management channel resources determined by the CID are dedicated to the connection when the CID is orthogonal. The first and second traffic management channel resources determined by the CID may be shared with other connections when the CID is non-orthogonal.

In a subsequent CID broadcast period 1131, the first and second terminals 1102 and 1104 may indicate to others that the selected CID is being used, especially if their CID is an orthogonal CID. For instance, the first terminal WT A 1102 may send a CID broadcast signal in the CID slot of either the first or second CID broadcast resource to inform to the second terminal WT B 1104 that the connection is still alive. The second terminal WT B 1104 may also send a CID broadcast signal in the CID slot of either the third or fourth CID broadcast resource to inform to the first terminal WT A 1102 that the connection is still alive.

Additionally, the first and second terminals WT A 1102 and WT B 1104 may monitor the CID broadcast resources to determine whether a collision exists with the selected CID 1132 and 1134; i.e., to determine if another terminal has selected the same transmission CID. If a CID collision is detected, the first and second terminals WT A 1102 and WT B 1104 may negotiate to change their CID during a subsequent paging period 1139. That is, the first and second terminals 1102 and 1104 select a new CID and map it to a CID slot allocated to non-orthogonal CIDs.

In another example, if the first terminal WT A 1102 is awaking from a hold period, it may wish to communicate with the second terminal WT B 1104 without having to wait until the next control slot 404 (FIG. 4) to determine which CIDs are in use. In that case, the first terminal WT A 1102 and WT B 1104 may select a non-orthogonal CID from the CID broadcast resource 1101. This may occur, for example, during a connection scheduling stage (e.g., 202 in FIG. 2).

Note that, after a non-orthogonal CID is in use between the first and second terminals WT A 1102 and WT B 1104, the terminals may attempt to negotiate a new orthogonal CID on the next paging period.

Figure 12A:
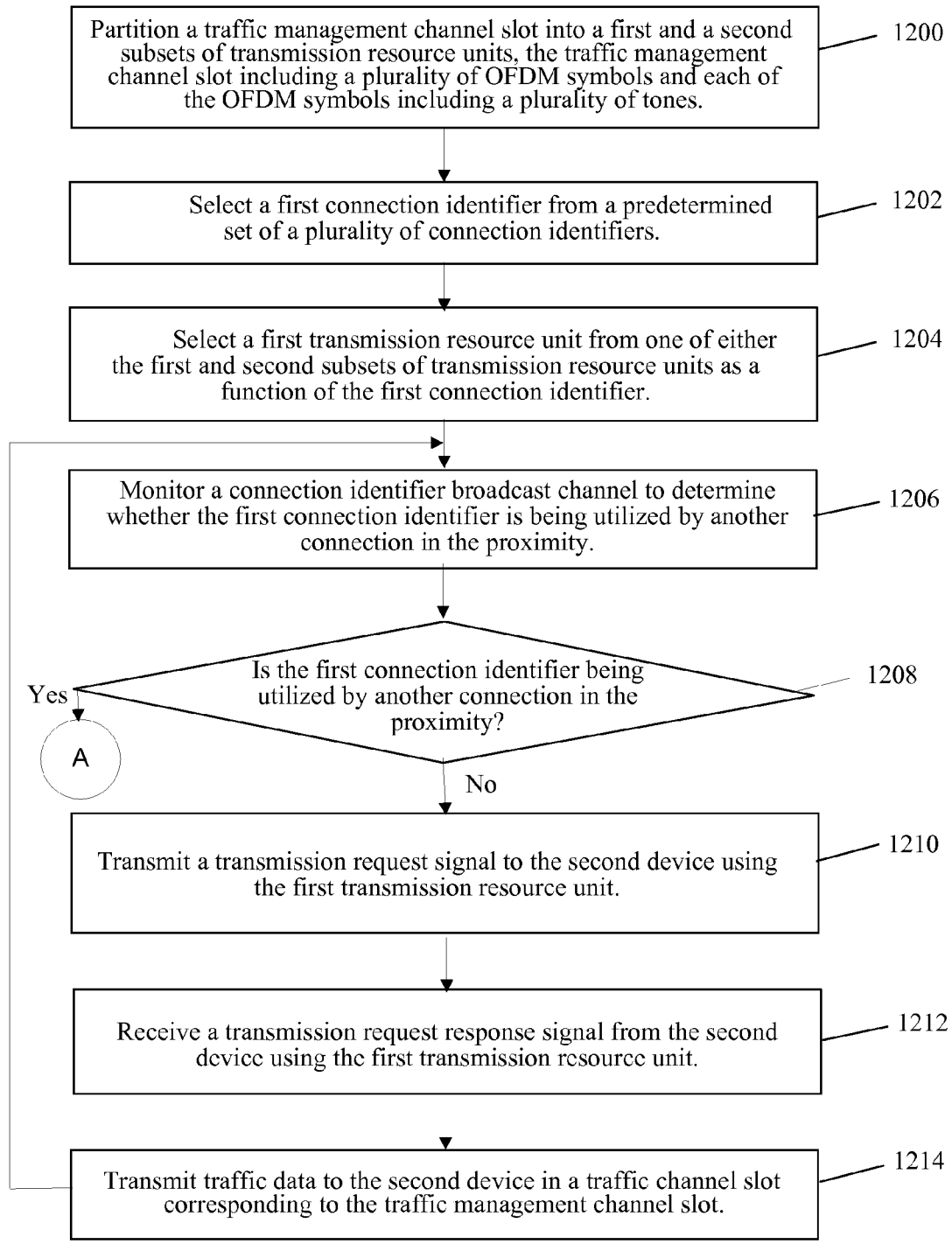
FIG. 12 (comprising FIGS. 12A, 12B and 12C) illustrates a method of operating a first device for generating and utilizing a first connection identifier (CID) for a peer-to-peer communication connection between the first device and a second device in a wireless communications network.
Figure 12B:
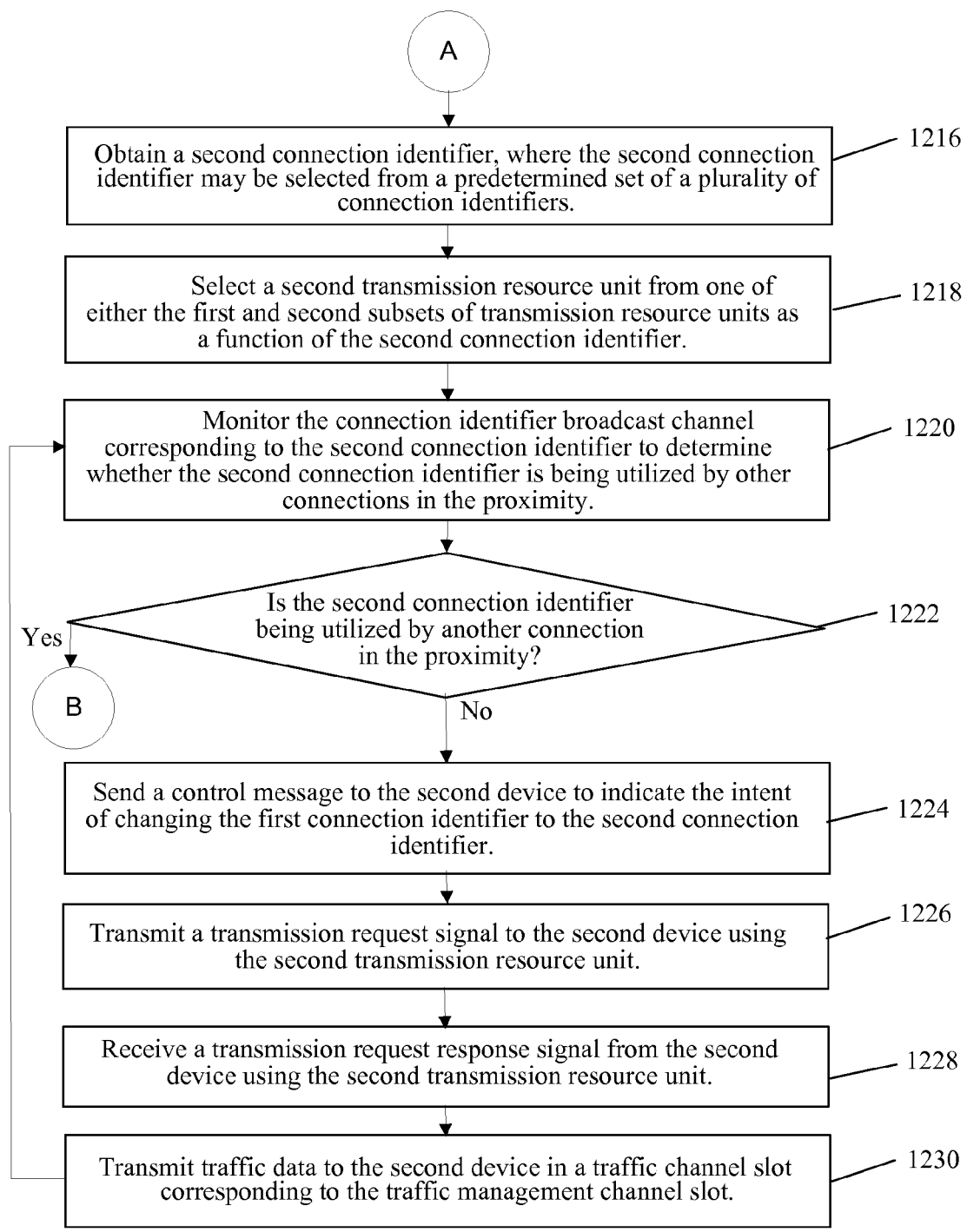
Figure 12C:
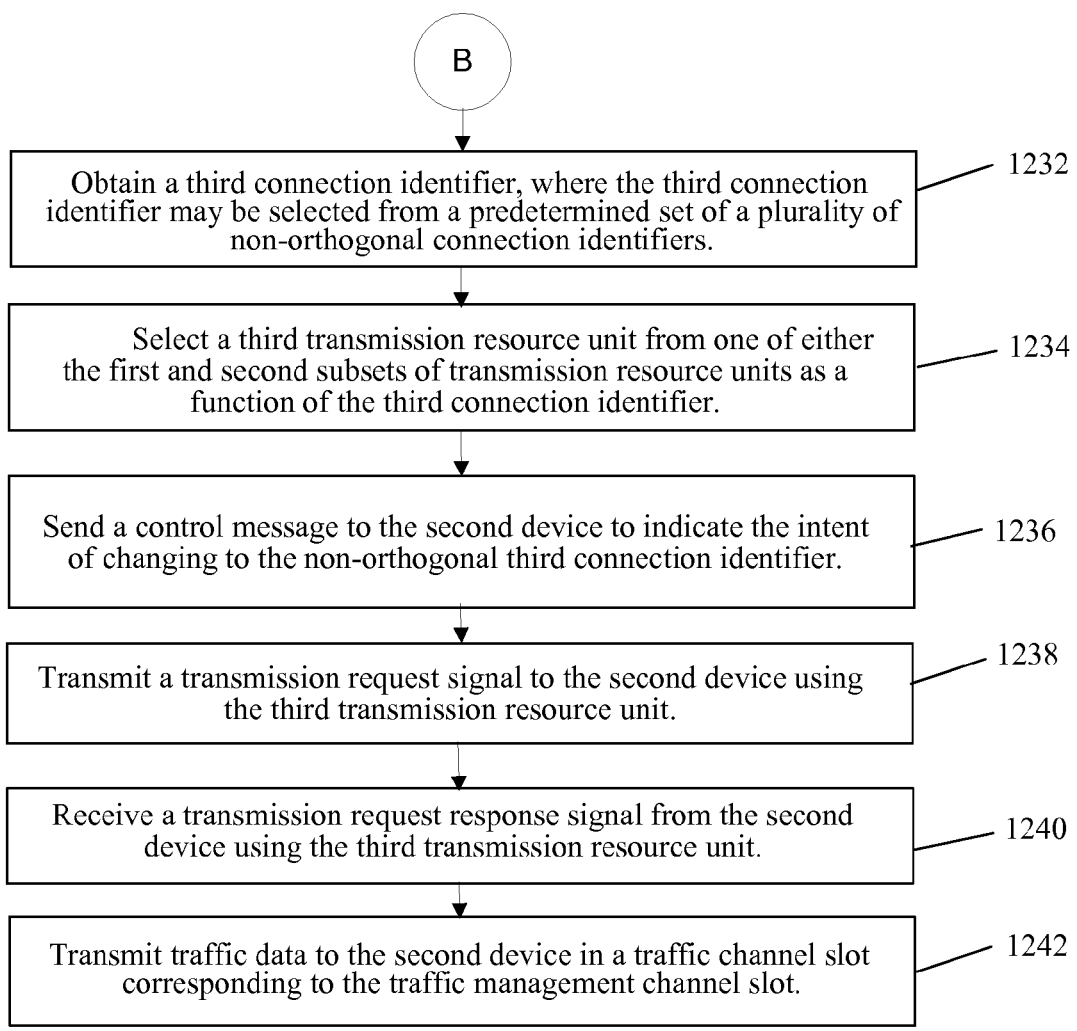

FIG. 12 (comprising FIGS. 12A, 12B and 12C) illustrates a method of operating a first device for generating and utilizing a first connection identifier (CID) for a peer-to-peer communication connection between the first device and a second device in a wireless communications network.

A traffic management channel slot (e.g., CID broadcast resource) is partitioned into a first and a second subsets of transmission resource units, the traffic management channel slot including a plurality of OFDM symbols and each of the OFDM symbols including a plurality of tones 1200. For instance, such partitioning is illustrated in FIGS. 6, 8, and 11. Each of the transmission resource units may include one of the plurality of tones in one of the plurality of OFDM symbols, the first subset of transmission resource units may be associated with orthogonal connection identifiers and the second subset of transmission units associated with non-orthogonal connection identifiers.

A first connection identifier may be obtained from a predetermined set of a plurality of connection identifiers 1202, where the first connection identifier may be an orthogonal connection identifier. A first transmission resource unit is selected from one of either the first and second subsets of transmission resource units as a function of the first connection identifier 1204. In one example, the first connection identifier may be a function of a first identifier of the first device and a second identifier of the second device if the determined first connection identifier is a non-orthogonal connection identifier.

The first device may monitor a connection identifier broadcast channel to determine whether the first connection identifier is being utilized by another connection in the proximity 1206. If it is determined that the first connection identifier is not being utilized by another connection in the proximity 1208, the first device transmits a transmission request signal to the second device using the first transmission resource unit 1210. For instance, the first transmission resource unit may be selected from one of the first and second subsets of transmission units as a function of whether the first connection identifier is an orthogonal or a non-orthogonal connection identifier. The first transmission resource unit may belong to the first subset if it is decided to use an orthogonal connection identifier as the first connection identifier. Otherwise, first transmission resource unit may belong to the second subset if it is decided to use a non-orthogonal connection identifier as the first connection identifier.

In response to the transmission request, the first device may receive a transmission request response signal from the second device using the first transmission resource unit 1212. The first device may then transmit traffic data to the second device in a traffic channel slot corresponding to the traffic management channel slot 1214. In one example, prior to transmitting traffic data, the first device may scramble the traffic data using a scrambling sequence derived from the first connection identifier and the value of the time counter. The receiving second device may descramble the traffic data using a descrambling sequence which it can derive from the connection identifier and the value of the time counter. The first and second devices may obtain a broadcast signal from a common network timing source which is used to determine the value of the time counter.

Otherwise, if it is determined that the first connection identifier is being utilized by another connection in the proximity 1208, the first device may obtain a second connection identifier, where the second connection identifier may be selected from a predetermined set of a plurality of non-orthogonal connection identifiers 1216. The first device may select a second transmission resource unit from one of either the first and second subsets of transmission resource units as a function of the second connection identifier 1218. The first device may monitor the connection identifier broadcast channel corresponding to the second connection identifier to determine whether the second connection identifier is being utilized by other connections in the proximity 1220. If it is determined that the second connection identifier is unused by another connection in the proximity 1222, a control message may be sent by the first device to the second device to indicate the intent to change the first connection identifier to the second connection identifier 1224. In various implementations, the second connection identifier may be either an orthogonal connection identifier or a non-orthogonal connection identifier. Prior to prior to monitoring the connection identifier broadcast channel and/or switching to the second connection identifier, the first and/or second devices may switch to a non-orthogonal connection identifier, which they can use for peer-to-peer communications during a time interval before they can switch to the second connection identifier.

In order to determine whether the first or second connection identifiers are in use by another connection, the first device may calculate a robustness measure of using an orthogonal connection identifier and switch to a non-orthogonal connection identifier if the calculated robustness measure is below a certain threshold. The robustness measure may be calculated as a function of the rate at which the first device has determined to switch from an orthogonal connection identifier to another connection identifier in a time interval.

If it is determined that the second connection identifier is not being utilized by another connection in the proximity 1222, the first device transmits a transmission request signal to the second device using the second transmission resource unit 1226. In response to the transmission request, the first device may receive a transmission request response signal from the second device using the second transmission resource unit 1228. The first device may then transmit traffic data to the second device in a traffic channel slot corresponding to the traffic management channel slot 1230.

If the first device determines that the second connection identifier is being utilized by another connection in the proximity 1222, a third connection identifier is obtained, where the third connection identifier may be selected from a predetermined set of a plurality of non-orthogonal connection identifiers 1232. A third transmission resource unit is selected from one of either the first and second subsets of transmission resource units as a function of the third connection identifier 1234. A control message may be sent to the second device to indicate the intent of changing to the non-orthogonal third connection identifier 1236. A transmission request signal may be sent by the first device to the second device using the third transmission resource unit 1238. In return, a transmission request response signal may be received by the first device from the second device using the third transmission resource unit 1240. Having established the connection, traffic data may be transmitted by the first device to the second device in a traffic channel slot corresponding to the traffic management channel slot 1242. Note that prior to transmitting traffic data, the traffic data may be scrambled using a scrambling sequence derived from the connection identifier being used and, optionally, a value of the time counter maintained by the first and second devices.

Wireless Terminal Configured to Use Hybrid CIDs in P2P Connection

Figure 13:
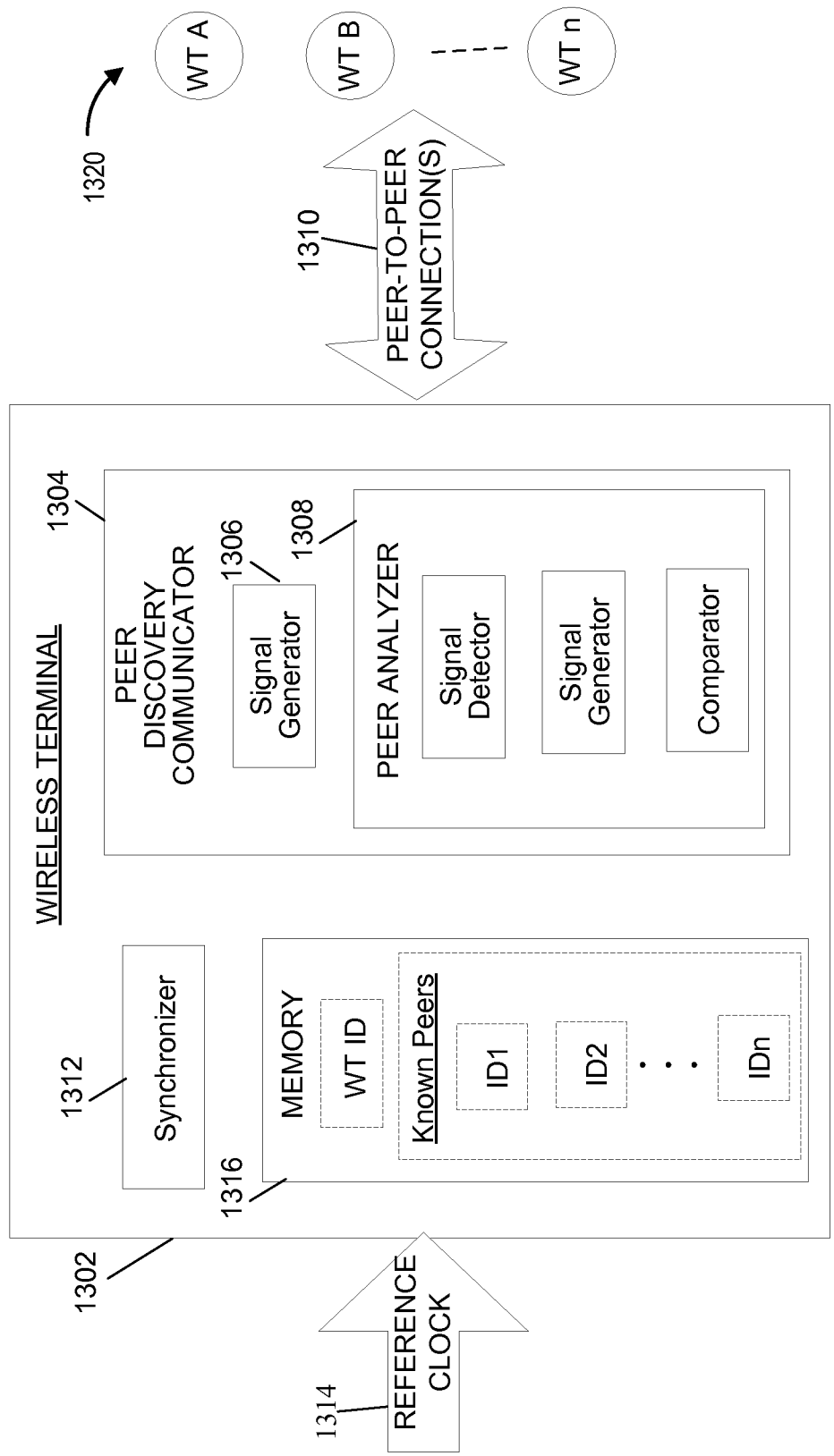
FIG. 13 is a block diagram illustrating an example of a wireless terminal that may be configured to utilize a hybrid transmission CID resource in a peer-to-peer network.

FIG. 13 is a block diagram illustrating an example of a wireless terminal that may be configured to utilize a hybrid transmission CID resource in a peer-to-peer network. The wireless terminal 1302 may communicate directly with substantially any number of disparate wireless terminals 1320 over peer-to-peer connections.

Wireless terminal 1302 may include a peer discovery communicator 1304 that may effectuate encoding, sending, receiving, evaluating, of signals associated with peer discovery during a peer discovery interval (or a plurality of peer discovery intervals). Peer discovery communicator 1304 may further comprise a signal generator 1306 and a peer analyzer 1308. The signal generator 1308 may generate and/or transmit a signal to disparate wireless terminals 1320 via wireless peer-to-peer connections 1310 and those wireless terminals may evaluate the signal to detect and identify wireless terminal 1302. Further, peer analyzer 1308 may receive signal(s) sent from disparate wireless terminal(s) 1320 and may evaluate the received signal(s) to detect and identity disparate wireless terminal(s) 1320 to which the received signal(s) correspond.

Wireless terminal 1302 may additionally include a synchronizer 1312 that conforms timing between wireless terminal 1302 and the disparate wireless terminals 1320. Synchronizer 1312 may obtain its timing from broadcast information (e.g., a common clock reference 1314) from a base station (not shown) in a vicinity of wireless terminal 1302. Similarly, synchronizers of the disparate wireless terminals 1320 may obtain their respective timing from the same broadcast information (reference clock 1314). The broadcast information may be, for example, a single-tone beacon signal, a CDMA PN (pseudo random) sequence signal, a pilot signal or other broadcast signal. Synchronizer 1312 may evaluate the obtained broadcast information to determine timing information. By way of illustration, wireless terminal 1302 and the disparate wireless terminals 1320 may receive and synchronize to the same broadcast information, and therefore, have a common understanding of time. The common notion of time may be utilized to partition a timeline into distinct intervals for differing types of functions such as, for instance, peer discovery, paging, and traffic, according to a predetermined pattern defined by an air interface protocol. Moreover, the timing information may be utilized by the signal generator 1306 to create signals for transmission during peer discovery and/or peer analyzer 1308 to evaluate received signals for peer discovery. Furthermore, the synchronizer 1312 obtains and analyzes the common clock reference 1314 to coordinate performance of various functions (e.g., peer discovery, paging, traffic) and determine a meaningful notion of time (e.g., time counter) consistent with disparate wireless terminals 1320 in the peer-to-peer network. Therefore, peers get the same timing (timing synchronized) without directly communicating with each other.

The wireless terminal 1302 may be associated with a unique identifier (WT ID). For example, wireless terminal 1302 may include memory 1316 that retains a unique identifier (WT ID) that corresponds to wireless terminal 1302. However, it is contemplated that wireless terminal 1302 may derive, obtain, etc., its unique identifier (WT ID) from any location (e.g., local and/or remote to wireless terminal 1302). Additionally, memory 1316 may retain any additional type of data and/or instructions related to wireless terminal 1302. Moreover, wireless terminal 1302 may include a processor (not shown) that executes instructions described herein.

Signal generator 1306 may create and/or transmit a signal to the disparate wireless terminals 1320. Signal generator 1306 may encode and/or send a signal in a peer discovery interval as a function of the unique identifier (WT ID) of wireless terminal 1302. In accordance with an example, the signal yielded by signal generator 1306 may be a single-tone beacon signal, which may provide power efficiency. Thus, signal generator 1306 may effectuate transmitting a particular tone on a selected OFDM symbol within a peer discovery interval. It is contemplated that more than one beacon signal may be transmitted (e.g., in a plurality of OFDM symbols). For example, where the transmitted signal is a beacon signal, a selected symbol time position (e.g., within the peer discovery interval) and/or a tone position may be derived by a hash function of the unique identifier of wireless terminal 1302 (WT ID) and a time variable (e.g., timing information obtained by synchronizer 1312, time counter) identifying a current peer discovery interval. Further, wireless terminal 1302 and disparate wireless terminals 1320 may have a common value of the time variable (e.g., due to synchronization achieved by listening to an infrastructure communication channel available in a geographic area).

Pursuant to another example, the identifier associated with wireless terminal 1302 (WT ID) may be broadcast to peer(s) by signal generator 1306 (and/or peer discovery communicator 1304). Peer(s) obtaining the signal may detect and/or identify wireless terminal 1302. For example, the signal yielded by signal generator 1306 may be an output of an M-bit hash function whose input is the plain-text name of wireless terminal 1302 (e.g., WT ID) and a current counter value supplied by a base station broadcast signal (e.g., common clock reference). The counter value, for instance, may be constant during a current peer discovery interval and may be decodable by all peers. The counter value may vary (e.g., increment in a modulo sense) from one peer discovery interval to another. Further, the hash function may be specified a priori by a protocol and known to the peers.

By way of example, wireless terminal 1302 may be located in a peer-to-peer network that includes disparate wireless terminal WT A, WT B and WT n 1320. Synchronizer 1312 may determine timing associated with peer-to-peer communications (e.g., based upon a received common clock reference). Further, at a time partitioned for peer discovery, signal generator 1306 may broadcast a signal (e.g., generated based upon an identifier (ID) of the originating wireless terminal 1302 and/or a current time) to disparate wireless terminals within range (e.g., disparate wireless terminals 1320). The signal may be received and utilized by disparate wireless terminals 1320 to detect wireless terminal 1302 and/or determine an identity of wireless terminal 1302. Moreover, peer analyzer 1308 may obtain broadcast signals from disparate wireless terminals 1320. Peer analyzer 1308 may evaluate the obtained signals to detect disparate wireless terminals 1320 and/or identify disparate wireless terminals 1320.

Peer discovery effectuated by peer discovery communicator 1304 may be passive. Further, peer discovery may be symmetric; thus, wireless terminal 1302 may detect and identify disparate wireless terminals WT A, WT B, and WT n 1320, and these disparate wireless terminals 1320 may detect and identify wireless terminal 1302. However, it is contemplated that a first wireless terminal may detect and identify a second wireless terminal, but the second wireless terminal may fail to detect and identify the first wireless terminal. Additionally, upon detection and identification, further communication (e.g., paging, traffic) between wireless terminal 1302 and disparate wireless terminal(s) 1320 may, but need not, be effectuated.

Peer analyzer 1302 may maintain a list of disparate wireless terminals 1320 that are detected to be present in the current time. The list may include all disparate wireless terminals 1320 or may include those in a predefined buddy list of wireless terminal 1302 or the user who is using wireless terminal 1302. As the time goes by, the list evolves, because some disparate wireless terminals 1320 may disappear (e.g., because the corresponding users move away), or because other disparate wireless terminals 1320 may appear (e.g., because the corresponding users move close). Peer analyzer 1308 may add the new disparate wireless terminals 1320 to the list or delete disappearing disparate wireless terminals 1320 from the list. In one embodiment, peer analyzer 1308 passively maintains the list. In this case, a first peer may detect the presence of a second peer and keep the second peer in its list without informing the second peer. As a result, the second peer may not know that the first peer has already kept the second peer in the list. By symmetry, depending on wireless channel and interference condition, the second peer may also detect the presence of the first peer and keep the first peer in its list without informing the first peer. In another embodiment, after the first peer detects the presence of the second peer, the first peer proactively sends a signal to inform the second peer so that the second peer now knows that the first peer has already kept the second peer in the list, even though the first peer has no data traffic to communicate with the second peer yet. The first peer may selectively decide whether it sends a signal. For example, the first peer may send a signal only to another peer that is in the predefined buddy list.

Additionally, the wireless terminal 1302 and components therein may be configured to perform one or more of the features illustrated in FIGS. 1-12.

Figure 14:
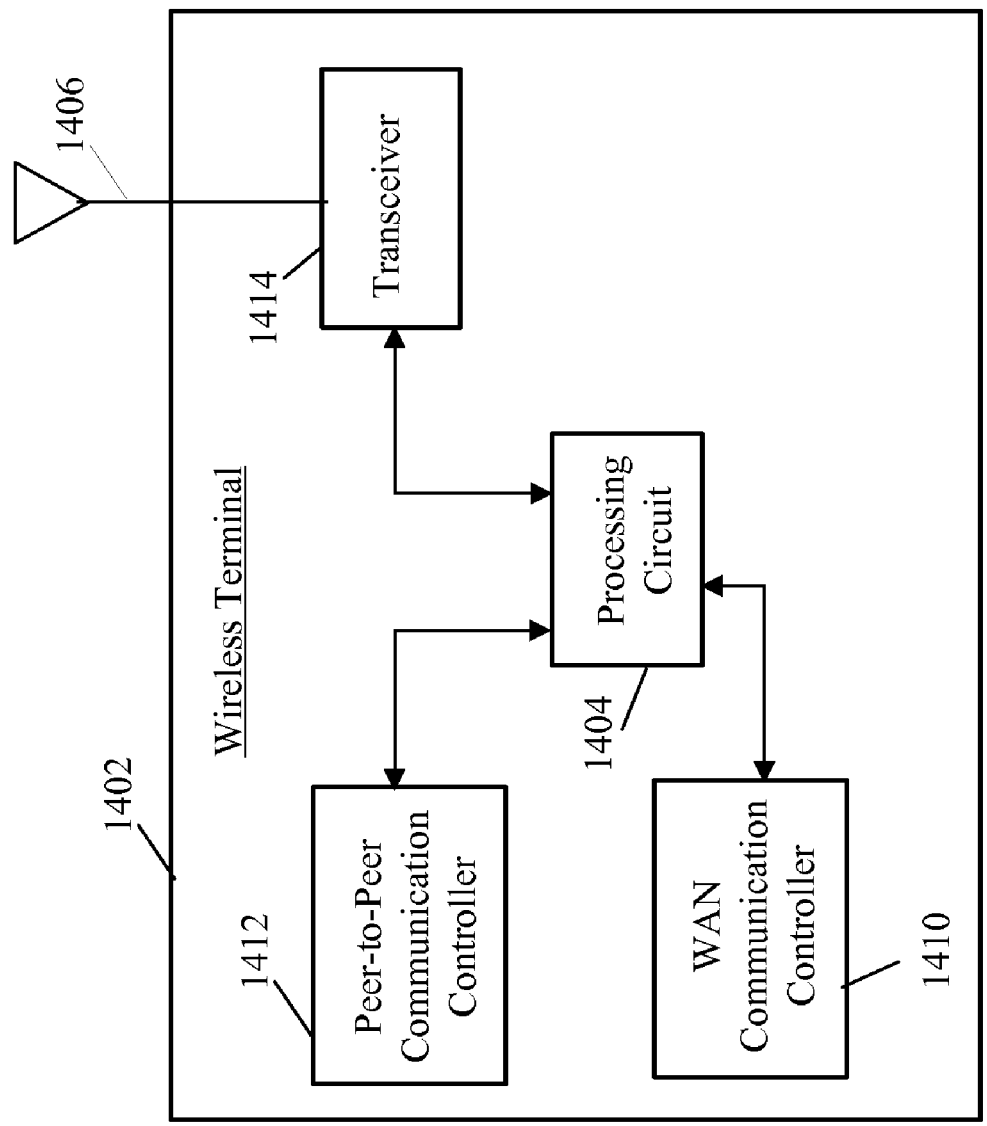
FIG. 14 is a block diagram of another embodiment of a wireless terminal that may be configured to utilize a hybrid transmission CID resource in a peer-to-peer network.

FIG. 14 is a block diagram of another embodiment of a wireless terminal that may be configured to utilize a hybrid transmission CID resource in a peer-to-peer network. The wireless terminal 1402 may include a processing circuit (e.g., one or more circuits or processors), a peer-to-peer communication controller 1412, a wide area network (WAN) controller 1410 and a transceiver 1414 coupled to an antenna 1406. The transceiver 1414 may include a (wireless) transmitter and a (wireless) receiver. The wireless terminal 1402 may communicate via a managed network infrastructure using the WAN communication controller 1410 and/or it may communicate over a peer-to-peer network using the peer-to-peer communication controller 1412. When performing peer-to-peer communications, the wireless terminal 1402 may be configured to perform one or more of the features illustrated in FIGS. 1-12.

It will be appreciated that, in accordance with one or more aspects described herein, inferences can be made regarding discovering and identifying peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying sources of peer discovery signals in a peer-to-peer network. In accordance with another example, an inference may be made related to estimating a probability of a peer being located within proximity based upon a number of detected signals that match an expected signal format and/or energy levels associated with detected signals. It will be appreciated that the foregoing examples are illustrative in nature and are not intended to limit the number of inferences that can be made or the manner in which such inferences are made in conjunction with the various embodiments and/or methods described herein.

One or more of the components, steps, and/or functions illustrated in FIGS. 1, 2, 3, 4, 5, 6, 7, 8, 9, 10, 11, 12, 13 and/or 14 may be rearranged and/or combined into a single component, step, or function or embodied in several components, steps, or functions. Additional elements, components, steps, and/or functions may also be added. The apparatus, devices, and/or components illustrated in FIGS. 1, 13 and/or 14 may be configured or adapted to perform one or more of the methods, features, or steps described in FIGS. 2-12. The algorithms described herein may be efficiently implemented in software and/or embedded hardware.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of operating a first device for generating and utilizing a connection identifier for a peer-to-peer communication connection between the first device and a second device in a wireless communications network, comprising:
partitioning a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;

selecting a first transmission resource unit from one of either the first and second subsets of transmission resource units as a function of a first connection identifier;

transmitting a transmission request signal to the second device using the first transmission resource unit; and transmitting traffic data to the second device in a traffic channel slot corresponding to the traffic management channel slot.

2. The method of claim 1, wherein the first transmission resource unit is selected from one of the first and second subsets of transmission units as a function of whether the first connection identifier is an orthogonal or a non-orthogonal connection identifier, the first transmission resource unit belonging to the first subset if it is decided to use an orthogonal connection identifier as the first connection identifier and the first transmission resource unit belonging to the second subset if it is decided to use a non-orthogonal connection identifier as the first connection identifier.

3. The method of claim 1, wherein the first and second subsets of transmission resource units are non-overlapping, and partitioning of the traffic management channel slot into the first and second subsets is predetermined and independent of the first connection identifier, the method further comprising:

determining the first connection identifier.

4. The method of claim 1, further comprising:

selecting the first connection identifier from a predetermined set of a plurality of connection identifiers if it is determined to use an orthogonal connection identifier;

monitoring a connection identifier broadcast channel to determine whether the first connection identifier is being utilized by another connection in the proximity; and switching to a second connection identifier if it is determined that the first connection identifier is being utilized by another connection in the proximity.

5. The method of claim 4, further comprising:

sending a control message to the second device to indicate the intent of changing the first connection identifier to the second connection identifier.

6. The method of claim 5 wherein the second connection identifier is a non-orthogonal connection identifier.

7. The method of claim 5 wherein the second connection identifier is an orthogonal connection identifier.

8. The method of claim 4, further comprising:

calculating a robustness measure of using an orthogonal connection identifier; and determining to switch to a non-orthogonal connection identifier if the calculated robustness measure is below a certain threshold.

9. The method of claim 8, wherein the robustness measure is calculated as a function of the rate at which the first device has determined to switch from an orthogonal connection identifier to another connection identifier in a time interval.

10. The method of claim 4, wherein the second connection identifier is an orthogonal connection identifier, the method further comprising:

prior to switching to the second connection identifier, monitoring the connection identifier broadcast channel corresponding to the second connection identifier to determine whether the second connection identifier is being utilized by other connections in the proximity; and determining to switch to the second connection identifier if it is determined that the second connection identifier is unused by another connection in the proximity.

11. The method of claim 10, further comprising:

prior to switching to the second connection identifier, switching to a non-orthogonal connection identifier.

12. The method of claim 10, further comprising:

prior to monitoring the connection identifier broadcast channel, switching to a non-orthogonal connection identifier.

13. The method of claim 1, further comprising:

determining the first connection identifier as a function of an identifier of the first device and a second identifier of the second device if the determined first connection identifier is a non-orthogonal connection identifier.

14. The method of claim 1, further comprising:

prior to transmitting traffic data, scrambling traffic data using a scrambling sequence, the scrambling sequence being derived from the first connection identifier and a value of the time counter.

15. A first device configured to generate and utilize a connection identifier for a peer-to-peer communication connection between the first device and a second device in a wireless communications network, comprising:

a transmitter and receiver for establishing the wireless peer-to-peer communication connection; and a processing circuit adapted to perform peer to peer communications through the transmitter and receiver over a peer-to-peer communication channel, the processing circuit configured to partition a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;

select a first transmission resource unit from one of either the first and second subsets of transmission resource units as a function of a first connection identifier;

transmit a transmission request signal to the second device using the first transmission resource unit; and transmit traffic data to the second device in a traffic channel slot corresponding to the traffic management channel slot.

16. The first device of claim 15, wherein the first transmission resource unit is selected from one of the first and second subsets of transmission units as a function of whether the first connection identifier is an orthogonal or a non-orthogonal connection identifier, the first transmission resource unit belonging to the first subset if it is decided to use an orthogonal connection identifier as the first connection identifier and the first transmission resource unit belonging to the second subset if it is decided to use a non-orthogonal connection identifier as the first connection identifier.

17. The first device of claim 15, wherein the first and second subsets of transmission resource units are non-overlapping, and partitioning of the traffic management channel slot into the first and second subsets is predetermined and independent of the first connection identifier, and the processing circuit is further adapted to:

determine the first connection identifier.

18. The first device of claim 15, wherein the processing circuit is further adapted to select the first connection identifier from a predetermined set of a plurality of connection identifiers if it is determined to use an orthogonal connection identifier;
monitor a connection identifier broadcast channel to determine whether the first connection identifier is being utilized by another connection in the proximity; and
switch to a second connection identifier if it is determined that the first connection identifier is being utilized by another connection in the proximity.

19. A first device configured to generate and utilize a connection identifier for a peer-to-peer communication connection between the first device and a second device in a wireless communications network, comprising:
means for partitioning a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
means for selecting a first transmission resource unit from one of either the first and second subsets of transmission resource units as a function of a first connection identifier;
means for transmitting a transmission request signal to the second device using the first transmission resource unit; and
means for transmitting traffic data to the second device in a traffic channel slot corresponding to the traffic management channel slot.

20. A circuit for generating and utilizing a connection identifier for a peer-to-peer communication connection between a first device and a second device in a wireless communications network, wherein the circuit operates in the first device and is adapted to:
partition a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
select a first transmission resource unit from one of either the first and second subsets of transmission resource units as a function of a first connection identifier;
transmit a transmission request signal to the second device using the first transmission resource unit; and
transmit traffic data to the second device in a traffic channel slot corresponding to the traffic management channel slot.

21. A non-transitory machine-readable medium comprising instructions for a first device to generate and utilize a connection identifier for a peer-to-peer communication connection between the first device and a second device in a wireless communications network, which when executed by a processor causes the processor to:
partition a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
select a first transmission resource unit from one of either the first and second subsets of transmission resource units as a function of a first connection identifier;
transmit a transmission request signal to the second device using the first transmission resource unit; and
transmit traffic data to the second device in a traffic channel slot corresponding to the traffic management channel slot.

22. A method of operating a target second device for generating and utilizing a connection identifier for a peer-to-peer communication connection between a first device and the second device in a wireless communications network, comprising:
partitioning a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
obtaining a first transmission resource unit from one of either the first and second subsets of transmission resource units as a function of a first connection identifier;
receiving a transmission request signal from the first device using the first transmission resource unit; and
receiving traffic data from the first device in a traffic channel slot corresponding to the traffic management channel slot.

23. The method of claim 22, wherein the first transmission resource unit is selected from one of the first and second subsets of transmission units as a function of whether the first connection identifier is an orthogonal or a non-orthogonal connection identifier, the first transmission resource unit belonging to the first subset if it is decided to use an orthogonal connection identifier as the first connection identifier and the first transmission resource unit belonging to the second subset if it is decided to use a non-orthogonal connection identifier as the first connection identifier.

24. The method of claim 22, wherein the first and second subsets of transmission resource units are non-overlapping, and partitioning of the traffic management channel slot into the first and second subsets is predetermined and independent of the first connection identifier.

25. The method of claim 22, further comprising:
selecting the first connection identifier from a predetermined set of a plurality of connection identifiers if it is determined to use an orthogonal connection identifier;
monitoring a connection identifier broadcast channel to determine whether the first connection identifier is being utilized by another connection in the proximity; and switching to a second connection identifier if it is determined that the first connection identifier is being utilized by another connection in the proximity.

26. The method of claim 22, further comprising:
determining the first connection identifier as a function of an identifier of the first device and a second identifier of the second device if the determined first connection identifier is a non-orthogonal connection identifier.

27. The method of claim 22, further comprising:
descrambling the traffic data using a descrambling sequence prior to transmission, the descrambling sequence being derived from the first connection identifier and a value of the time counter.

28. A target second device configured to generate and utilize a connection identifier for a peer-to-peer communication connection between a first device and the second device in a wireless communications network, comprising:
a transmitter and receiver for establishing the wireless peer-to-peer communication connection; and
a processing circuit adapted to perform peer to peer communications through the transmitter and receiver over a peer-to-peer communication channel, the processing circuit configured to:
partition a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
select a first transmission resource unit from one of either the first and second subsets of transmission resource units as a function of a first connection identifier;
receiving a transmission request signal from the first device using the first transmission resource unit; and
receiving traffic data from the first device in a traffic channel slot corresponding to the traffic management channel slot.

29. The second device of claim 28, wherein the first transmission resource unit is selected from one of the first and second subsets of transmission units as a function of whether the first connection identifier is an orthogonal or a non-orthogonal connection identifier, the first transmission resource unit belonging to the first subset if it is decided to use an orthogonal connection identifier as the first connection identifier and the first transmission resource unit belonging to the second subset if it is decided to use a non-orthogonal connection identifier as the first connection identifier.

30. The second device of claim 28, wherein the first and second subsets of transmission resource units are non-overlapping, and partitioning of the traffic management channel slot into the first and second subsets is predetermined and independent of the first connection identifier.

31. The second device of claim 28, wherein the processing circuit is further adapted to:
select the first connection identifier from a predetermined set of a plurality of connection identifiers if it is determined to use an orthogonal connection identifier;
monitor a connection identifier broadcast channel to determine whether the first connection identifier is being utilized by another connection in the proximity; and
switch to a second connection identifier if it is determined that the first connection identifier is being utilized by another connection in the proximity.

32. The second device of claim 31 wherein the second connection identifier is a non-orthogonal connection identifier.

33. The second device of claim 28, wherein the processing circuit is further adapted to:
determine the first connection identifier as a function of an identifier of the first device and a second identifier of the second device.

34. The second device of claim 28, wherein the processing circuit is further adapted to:
scramble the traffic data using a scrambling sequence, the scrambling sequence being derived from the first connection identifier and a value of the time counter prior to transmitting traffic data.

35. A target second device configured to generate and utilize a connection identifier for a peer-to-peer communication connection between a first device and the second device in a wireless communications network, comprising:
means for partitioning a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
means for selecting a first transmission resource unit from one of either the first and second subsets of transmission resource units as a function of a first connection identifier;
means for receiving a transmission request signal from the first device using the first transmission resource unit; and
means for receiving traffic data from the first device in a traffic channel slot corresponding to the traffic management channel slot.

36. The second device of claim 35, wherein the first transmission resource unit is selected from one of the first and second subsets of transmission units as a function of whether the first connection identifier is an orthogonal or a non-orthogonal connection identifier, the first transmission resource unit belonging to the first subset if it is decided to use an orthogonal connection identifier as the first connection identifier and the first transmission resource unit belonging to the second subset if it is decided to use a non-orthogonal connection identifier as the first connection identifier.

37. The second device of claim 35, wherein the first and second subsets of transmission resource units are non-overlapping, and partitioning of the traffic management channel slot into the first and second subsets is predetermined and independent of the first connection identifier.

38. The second device of claim 35, further comprising:
means for selecting the first connection identifier from a predetermined set of a plurality of connection identifiers if it is determined to use an orthogonal connection identifier;
means for monitoring a connection identifier broadcast channel to determine whether the first connection identifier is being utilized by another connection in the proximity; and means for switching to a second connection identifier if it is determined that the first connection identifier is being utilized by another connection in the proximity.

39. A circuit for generating and utilizing a connection identifier for a peer-to-peer communication connection between a first device and a target second device in a wireless communications network, wherein the circuit operates in the second device and is adapted to:
- partition a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
- select a first transmission resource unit from one of either the first and second subsets of transmission resource units as a function of a first connection identifier;
- receive a transmission request signal from the first device using the first transmission resource unit; and
- receive traffic data from the first device in a traffic channel slot corresponding to the traffic management channel slot.

40. A non-transitory machine-readable medium comprising instructions for a target second device to generate and utilize a connection identifier for a peer-to-peer communication connection between a first device and the second device in a wireless communications network, which when executed by a processor causes the processor to:
- partition a traffic management channel slot into a first and a second subsets of transmission resource units, the traffic management channel slot including a plurality of OFDM symbols and each of the OFDM symbols including a plurality of tones, each of the transmission resource units including one of the plurality of tones in one of the plurality of OFDM symbols, the first subset of transmission resource units associated with orthogonal connection identifiers and the second subset of transmission units associated with non-orthogonal connection identifiers;
- select a first transmission resource unit from one of either the first and second subsets of transmission resource units as a function of a first connection identifier;
- receive a transmission request signal from the first device using the first transmission resource unit; and
- receive traffic data from the first device in a traffic channel slot corresponding to the traffic management channel slot.

* * * * *